US012646363B2

(12) United States Patent
Becker et al.

(10) Patent No.: US 12,646,363 B2
(45) Date of Patent: Jun. 2, 2026

(54) LIGHTWEIGHT AUTONOMOUS SYSTEM EVALUATION PLATFORM

(71) Applicant: Aurora Operations, Inc., Pittsburgh, PA (US)

(72) Inventors: Brian C. Becker, Pittsburgh, PA (US); Peter VanTuyl Bentley, Seattle, WA (US); Matthew Thomas Bradley, Pittsburgh, PA (US); Nathan Falk, San Francisco, CA (US); Jack Wyatt Harris, Brooklyn, NY (US); Marion Le Borgne, San Francisco, CA (US); Timothy Patrick Wojtaszek, Mill Valley, CA (US); Tashwin Kaur Khurana, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 327 days.

(21) Appl. No.: 18/467,273

(22) Filed: Sep. 14, 2023

(65) Prior Publication Data

US 2024/0087378 A1     Mar. 14, 2024

Related U.S. Application Data

(60) Provisional application No. 63/406,598, filed on Sep. 14, 2022.

(51) Int. Cl.
| | |
|---|---|
| *G07C 5/08* | (2006.01) |
| *B60W 60/00* | (2020.01) |
| *G06F 16/901* | (2019.01) |

(52) U.S. Cl.
CPC ......... *G07C 5/0841* (2013.01); *B60W 60/001* (2020.02); *G06F 16/901* (2019.01); *B60W 2540/215* (2020.02)

(58) Field of Classification Search
CPC .............. G07C 5/0841; B60W 60/001; B60W 2540/215; G06F 16/901
See application file for complete search history.

(56) References Cited

U.S. PATENT DOCUMENTS

2014/0344622 A1* 11/2014 Huang ................ G06F 11/0775
                                                            714/37
2017/0357320 A1* 12/2017 Chaudhri .............. G06F 3/0412
(Continued)

OTHER PUBLICATIONS

Aurora, "The offline executor: Virtual testing and the Aurora Driver", Aug. 20, 2019, https://blog.aurora.tech/engineering/the-offline-executor, retrieved on Oct. 10, 2023, 9 pages.
(Continued)

*Primary Examiner* — Jay A Morrison
(74) *Attorney, Agent, or Firm* — Dority & Manning, P.A.

(57) ABSTRACT

An example method includes (a) generating a request to obtain log data descriptive of operation of an autonomous vehicle control system in a subject scenario, the log data indexed by an indexing parameter; (b) submitting the request to a log repository service, the log repository service configured to receive the request and serve, responsive to the request, log metadata; (c) loading, based on the log metadata and an index value of the indexing parameter, a log data sketch associated with the index value; and (d) loading, based on the log metadata and the index value, and responsive to an inspection indicator, detailed log data associated with the index value.

20 Claims, 17 Drawing Sheets

(56) References Cited

U.S. PATENT DOCUMENTS

| 2018/0103348 A1* | 4/2018 | Malone | ............... H04W 4/029 |
| 2020/0134077 A1* | 4/2020 | Tong | .................. G06F 16/2246 |
| 2023/0316816 A1* | 10/2023 | O'Grady | ............. G07C 5/0808 |
| | | | 701/31.4 |

OTHER PUBLICATIONS

AVS Auto, "Make a leap with your autonomous and robotics data", https://avs.auto/#/, retrieved on Oct. 10, 2023, 4 pages.
AVS Auto, "Playground", https://avs.auto/playground/, retrieved on Oct. 12, 2023, 1 page.
AVS Auto, "Streetscape.gl", https://avs.auto/demo/index.html, retrieved on Oct. 12, 2023, 6 pages.
Github. "Basic Optimization of the WebGL Rendering Pipeline", https://rye-terrell.github.io/basic-webgl-optimizations/, retrieved on Oct. 10, 2023, 16 pages.
Uber Blog, "Engineering Uber's Self-Driving Car Visualization Platform for the Web", Aug. 28, 2017, https://www.uber.com/blog/atg-dataviz/, 6 pages.

* cited by examiner

Log Data
402

Log Data
402

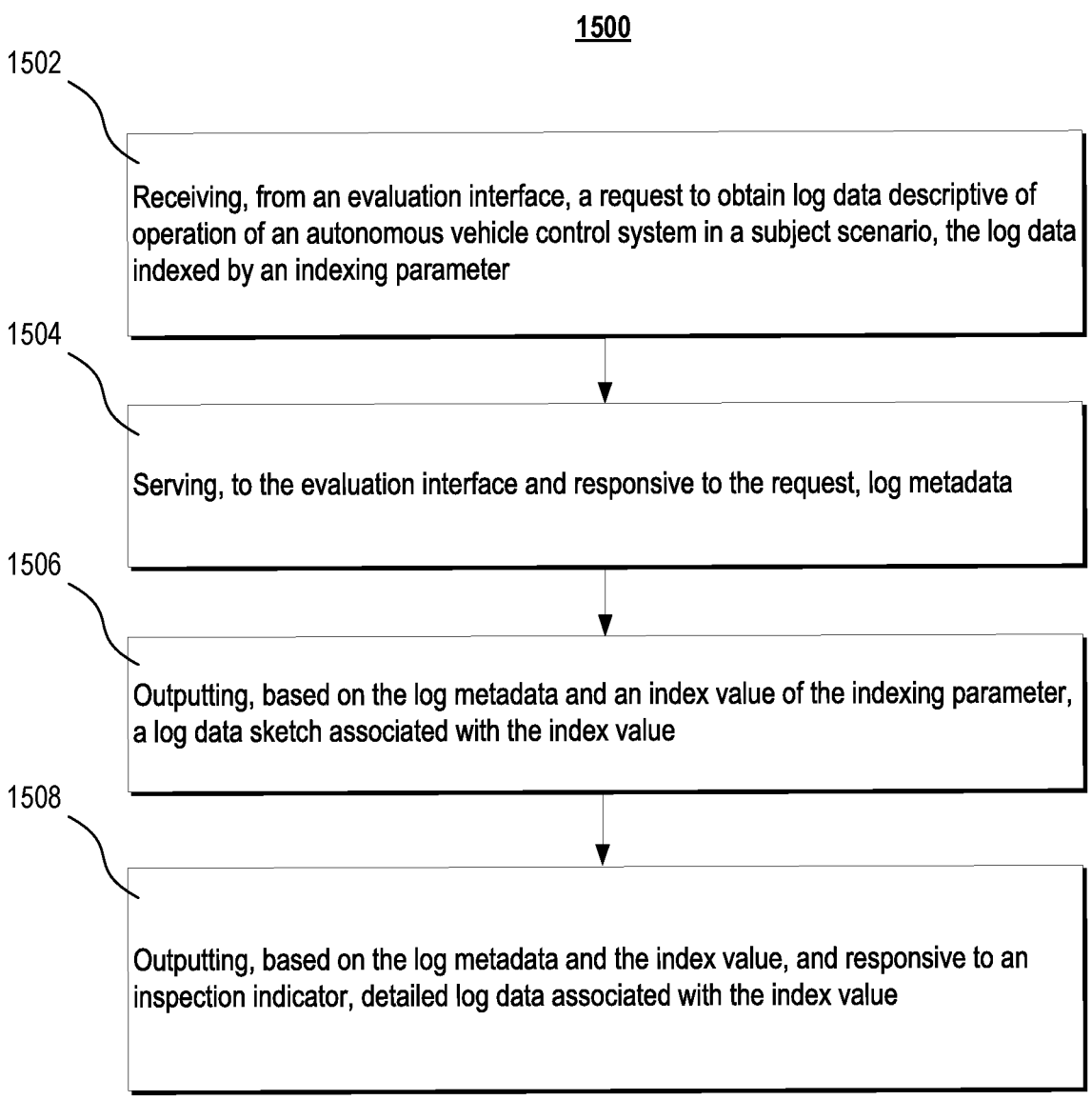

1500

1502

Receiving, from an evaluation interface, a request to obtain log data descriptive of operation of an autonomous vehicle control system in a subject scenario, the log data indexed by an indexing parameter

1504

Serving, to the evaluation interface and responsive to the request, log metadata

1506

Outputting, based on the log metadata and an index value of the indexing parameter, a log data sketch associated with the index value

1508

Outputting, based on the log metadata and the index value, and responsive to an inspection indicator, detailed log data associated with the index value

FIG. 15

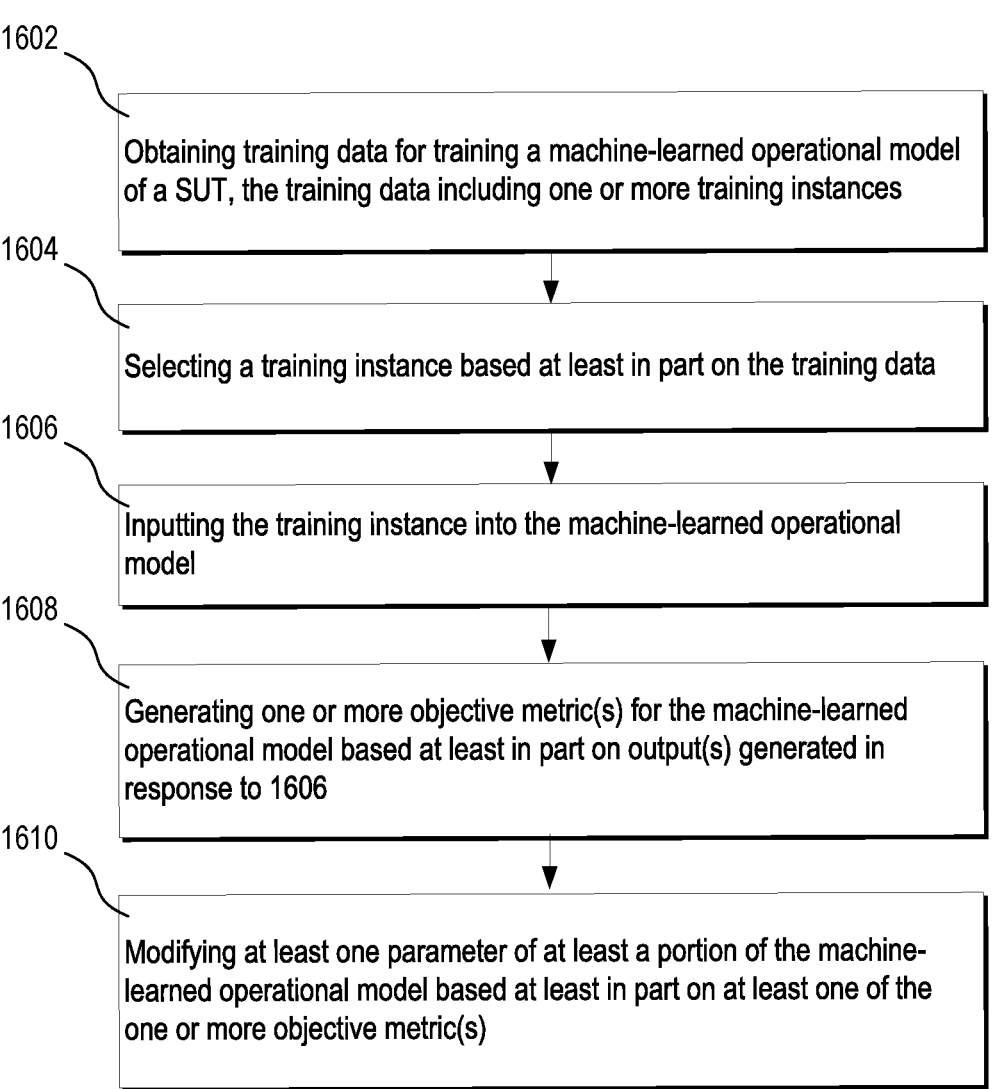

1600

1602 — Obtaining training data for training a machine-learned operational model of a SUT, the training data including one or more training instances 1604 — Selecting a training instance based at least in part on the training data 1606 — Inputting the training instance into the machine-learned operational model 1608 — Generating one or more objective metric(s) for the machine-learned operational model based at least in part on output(s) generated in response to 1606

1610 — Modifying at least one parameter of at least a portion of the machine-learned operational model based at least in part on at least one of the one or more objective metric(s)

*FIG. 16*

LIGHTWEIGHT AUTONOMOUS SYSTEM EVALUATION PLATFORM

PRIORITY CLAIM

This application claims the benefit of and priority to U.S. Provisional Patent Application No. 63/406,598, filed Sep. 14, 2022. U.S. Provisional Patent Application No. 63/406, 598 is hereby incorporated by reference herein in its entirety.

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

The present disclosure is directed to a lightweight autonomous system evaluation platform. Autonomous systems can include complex processing flows that often involve machine-learned models. The development of such systems often involves reviewing log data to evaluate system traces that reveal the inner workings of the systems. This detailed evaluation can provide important information about the advancements and regressions resulting from different updates to the systems.

Facilitating a detailed evaluation can involve processing and transmitting large amounts of log data to a user endpoint for processing and viewing detailed traces of system operation. The log data can include very data-intensive data sources. Example data sources include map data, localization data, perception data (e.g., sensor data, such as image data, lidar data, etc., or tracking data, such as object recognition data, etc.), planning data (e.g., intermediate or final predictions, candidate or planned trajectories, etc.), control data (e.g., output signals for controlling hardware on the vehicle, etc.).

Advantageously, the present disclosure provides a low-latency, lightweight platform for inspecting detail-rich autonomous system traces. For example, a log data repository service can serve log data to an evaluation interface at varying levels of detail as needed. For rapid loading, for instance, the log data repository service can serve a lightweight log data sketch to give an initial look at a particular set of log data from an initial viewpoint (e.g., spatial viewpoint, temporal viewpoint, etc.). In response to an indication of inspection of a more focused subset of the log data (e.g., a pause in scrubbing a timeline input interface, etc.), the log data repository service can serve more detailed log data to render the more focused subset of the log data in greater detail. The contents of the log data sketch, its level of detail, and the detail level of the detailed log data can be configurable using a log metadata file that can be quickly created or loaded for governing the service of the log data. For example, users can configure the log metadata to adapt the types of data to be provided for evaluation. For instance, the log data can include multiple different types of data (e.g., data sources, data modalities, etc.). Based on the configuration of the log metadata file, an evaluation interface can present the different types of data in different levels of detail (or not at all).

Some prior techniques rely on simply buffering detailed data on-device to aid quick retrieval of the detailed data. But buffering generally relies on guesses of what data will be of interest, and thus often results in wasted bandwidth (e.g., network bandwidth, processing bandwidth, memory bandwidth, etc.) to transmit detailed data that may not be accessed or used.

Some other prior techniques naively attempt to download full-fidelity data at first request. But this can lead to slow responsiveness, especially in resource-constrained computing environments (e.g., network bandwidth constraints, processing constraints, memory constraints, etc.).

In contrast, example implementations of the present disclosure can provide for on-demand, dynamic retrieval of log data of interest. For instance, the platform can use a lightweight sketch of the log data to provide an initial view. The sketch can be a lightweight representation of the log data, such as can be obtained by downsampling the log data. For instance, the sketch can include decreased precision (e.g., quantization, etc.), decreased resolution (e.g., lower refresh rate, fewer pixels, etc.), other compression methods, and the like. In some implementations, a tiered approach can prioritize certain types of data (e.g., always load, load on demand, full load, etc.) so that more important or more salient data can be loaded first.

The initial view can facilitate scanning through a large range of log data (e.g., a large range of an indexing parameter, such as time, etc.) to find a particular region of interest (e.g., a timestamp). An inspection indicator (e.g., a selection, hovering over, a pause, etc.) can trigger determining an indexing parameter associated with a region of interest (e.g., timestamp) for retrieving more detailed log data associated with that indexing parameter. The inspection indicators can include a queue of desired information. For instance, playlists can be used to queue the sets of log data for review. Automatic or manual advancement through the list can trigger retrieval of more detailed information while an initial view loads using sketched data.

In some implementations, the log data (e.g., log data sketch, detailed log data, etc.) can facilitate simultaneous evaluation of different systems or different aspects of a system. For instance, a split-screen configuration can be used to present log data descriptive of different systems, different versions of a system, different components of a system, etc. For example, a split screen configuration can be used for side-by-side evaluation of an autonomous system with and without a given adjustment or tweak.

Example implementations can provide a number of technical effects and benefits. Computing systems implementing example implementations of the present disclosure can more efficiently use computing resources to inspect complex systems. By parameterizing resource requests based on interface activity, example implementations can decrease network bandwidth usage, decrease processing power usage, decrease memory usage, decrease latency, etc. Example implementations can accelerate the pace of evaluation of systems under test by decreasing computational overhead associated with loading and browsing detail-rich log data. For instance, example implementations can provide for fast loading using low bandwidth, live scrubbing (e.g., dragging a slider and seeing data update in real-time, such as scenes from a video or 3D visualizations from log data, etc.), starting playback at any timestamp without delay, and viewing log data recordings at faster than real-time. In turn, example implementations can thus provide for improvements to the systems under test by more efficiently and effectively facilitating iterative refinements thereto.

In this manner, for example, example implementations of the present disclosure can help improve the operation of autonomous vehicles and advance the field of autonomous driving as a whole. Example implementations of the present disclosure can decrease energy expenditure of testing, validation, and development computing systems and enable testing, validation, and development of autonomous vehicle systems to be performed on smaller, lighter, more energy-efficient devices, thereby improving access to and operation of such equipment. In this manner, for instance, example implementations of the present disclosure can accelerate the adoption of autonomous vehicles, thereby facilitating improved traffic flow, decreasing opportunity for human driver error, increasing energy-efficient driving behavior, etc. across greater numbers of vehicles, thereby achieving not only individual performance gains but also significant population-wide improvement that advances the field of autonomous driving as a whole.

For example, in an aspect, the present disclosure provides for an example computer-implemented method for autonomous vehicle control system evaluation. The example method includes (a) generating a request to obtain log data descriptive of operation of an autonomous vehicle control system in a subject scenario, the log data indexed by an indexing parameter. The example method includes (b) submitting the request to a log repository service, the log repository service configured to receive the request and serve, responsive to the request, log metadata. The example method can include (c) loading, based on the log metadata and an index value of the indexing parameter, a log data sketch associated with the index value. The example method can include (d) loading, based on the log metadata and the index value, and responsive to an indication for further evaluation, detailed log data associated with the index value.

In some implementations, the log data sketch includes data at a first fidelity with respect to the log data. In some implementations the detailed log data includes data at a second fidelity higher than the first fidelity.

In some implementations, loading the log data sketch includes rendering the log data sketch on a display interface.

In some implementations, a user input sequence includes a plurality of index values of the indexing parameter. In some implementations, the indication of further evaluation corresponds to a selection of a particular index value of the plurality of index values.

In some implementations, a sketch compression value associated with the log data sketch is adjusted based on a communication speed between a log data repository and an evaluation interface.

In some implementations, the example method(s) include (e) modifying, from a default value, one or more parameters of the log metadata to customize contents of the log data sketch.

In some implementations, the detailed log data is dynamically loaded or output on-demand.

In some implementations, the indication of further evaluation corresponds to a user input.

In some implementations, the user input sequence corresponds to a scrubbing input, and the selection of the particular index value corresponds to a rate change in the scrubbing input associated with the particular index value.

In some implementations, the indexing parameter is time.

In some implementations, the log data sketch includes data at a first resolution. In some implementations, the detailed log data includes data at a second resolution higher than the first resolution.

In some implementations, the log data sketch includes a downsampled representation of the log data.

In some implementations, the log data sketch includes a reduced range of log data values from the log data.

In some implementations, the evaluation interface runs in a browser, and log metadata is retrieved upon loading of an initial set of markup instructions for the evaluation interface.

In an aspect, the present disclosure provides for an example computing system that includes one or more processors. The example computing system includes one or more example non-transitory computer-readable media storing instructions executable by the one or more processors to cause the computing system to perform operations. The example operations include, (a) generating a request to obtain log data descriptive of operation of an autonomous vehicle control system in a subject scenario, the log data indexed by an indexing parameter. The example, operations include (b) submitting the request to a log repository service, the log repository service configured to receive the request and serve, responsive to the request, log metadata. The example operations include (c) loading, based on the log metadata and an index value of the indexing parameter, a log data sketch associated with the index value. The example operations include (d) loading, based on the log metadata and the index value, and responsive to an indication for further evaluation, detailed log data associated with the index value.

In some implementations, the log data sketch includes data at a first fidelity with respect to the log data. In some implementations the detailed log data includes data at a second fidelity higher than the first fidelity.

In some implementations, loading the log data sketch includes rendering the log data sketch on a display interface.

In some implementations, a user input sequence includes a plurality of index values of the indexing parameter. In some implementations, the indication of further evaluation corresponds to a selection of a particular index value of the plurality of index values.

In some implementations, the example operation(s) include (e) modifying, from a default value, one or more parameters of the log metadata to customize contents of the log data sketch.

In an aspect, the present disclosure provides for one or more example non-transitory computer-readable media storing instructions that are executable to cause one or more processors to perform operations. The example operations include, (a) generating a request to obtain log data descriptive of operation of an autonomous vehicle control system in a subject scenario, the log data indexed by an indexing parameter. The example, operations include (b) submitting the request to a log repository service, the log repository service configured to receive the request and serve, responsive to the request, log metadata. The example operations include (c) loading, based on the log metadata and an index value of the indexing parameter, a log data sketch associated with the index value. The example operations include (d) loading, based on the log metadata and the index value, and responsive to an indication for further evaluation, detailed log data associated with the index value.

In an example aspect, the present disclosure provides for an example computer-implemented method for autonomous vehicle control system evaluation. In some implementations, the method includes (a) receiving, from an evaluation interface, a request to obtain log data descriptive of operation of an autonomous vehicle control system in a subject scenario, the log data indexed by an indexing parameter. In some implementations, the method includes (b) serving to the evaluation interface and responsive to the request, log metadata. In some implementations, the method includes (c) outputting, based on the log metadata and an index value of the indexing parameter, a log data sketch associated with the index value. In some implementations, the method includes (d) outputting, based on the log metadata and the index value, and responsive to an indication for further evaluation, detailed log data associated with the index value.

In some implementations, the log data is a trace log descriptive of one or more intermediate values generated by the autonomous vehicle control system.

In some implementations, loading the log data sketch includes loading the log data sketch into volatile memory. In some implementations, loading the detailed log data includes loading the detailed log data into volatile memory.

In some implementations, loading the detailed log data includes rendering the detailed log data on a display interface.

In some implementations, at least one of the log data sketch or the detailed log data is obtained over a network.

In some implementations, a sketch compression value corresponds to an amount of detail omitted from the log data.

In some implementations, the log data is modified to omit or add log data of interest.

In some implementations, the detailed log data is dynamically loaded or output on-demand.

In some implementations, the log data includes a plurality of data modalities.

In some implementations, the plurality of data modalities include perception data and planning data.

In some implementations, the log data sketch includes log data reduced according to an identifier of an object of interest.

In some implementations, the detailed log data is not buffered.

In some implementations, the log data includes at least one of localization data, map data, perception data, planning data, control data, communications data, or other data.

In some implementations, the evaluation platform provides for rendering a 3D scene with visualizations of at least one of sensor, mapping, perception, simulation, or motion planning data.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIG. 14 is an example flowchart of an example method for autonomous vehicle control system evaluation, according to some implementations of the present disclosure;

FIG. 15 is an example flowchart of an example method for autonomous vehicle control system evaluation, according to some implementations of the present disclosure;

FIG. 16 is an example flowchart of an example method for training machine-learned model(s), according to some implementations of the present disclosure.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

Figure 1:
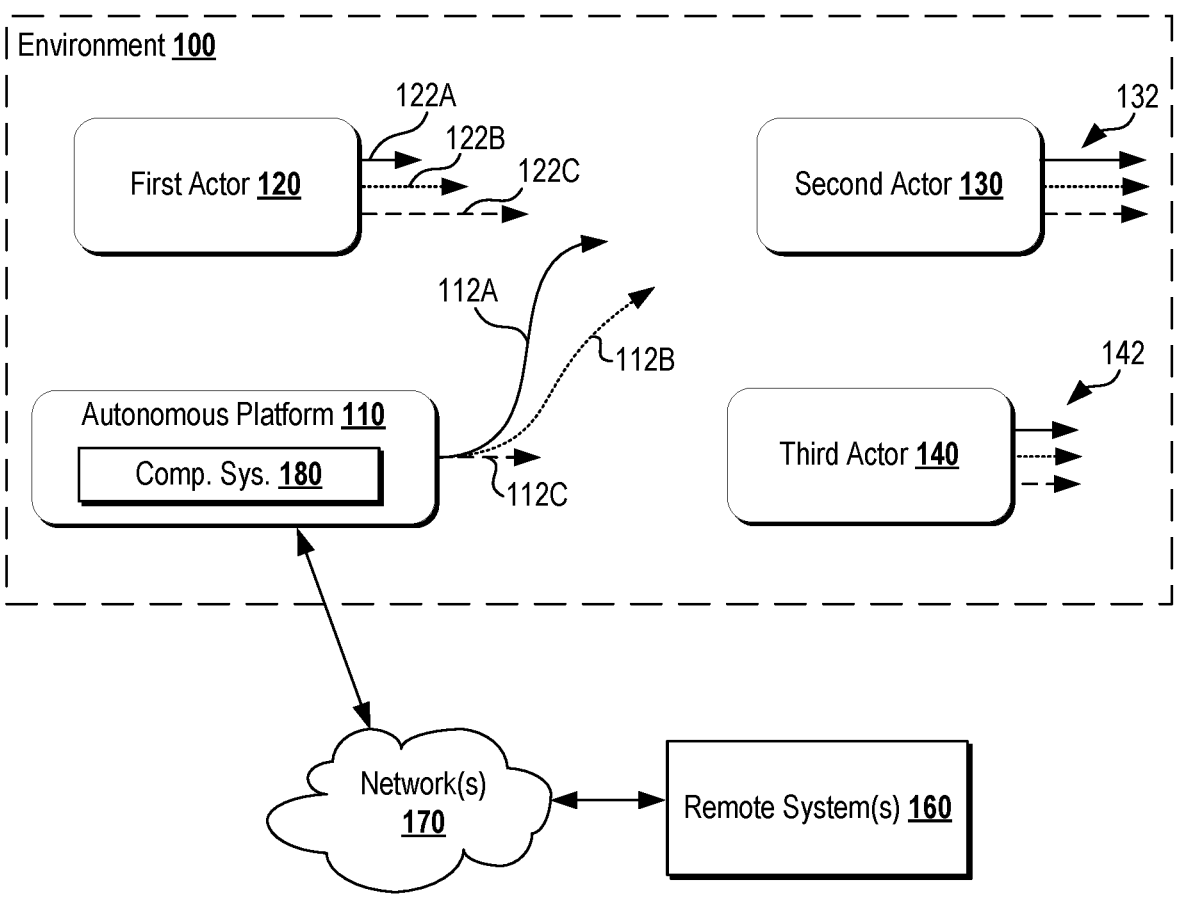
FIG. 1 is a block diagram of an example operational scenario, according to some implementations of the present disclosure.

With reference to FIGS. 1-17, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, autonomous platform 110 can move through environment 100 and interact with the object(s) that are located within environment 100 (e.g., first actor 120, second actor 130, third actor 140, etc.). Autonomous platform 110 can optionally be configured to communicate with remote system(s) 160 through network(s) 170.

Environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

Autonomous platform 110 can be any type of platform configured to operate within environment 100. For example, autonomous platform 110 can be a vehicle configured to autonomously perceive and operate within environment 100. The vehicles can be a ground-based autonomous vehicle such as, for example, an autonomous car, truck, van, etc. Autonomous platform 110 can be an autonomous vehicle that can control, be connected to, or be otherwise associated with implements, attachments, and/or accessories for transporting people or cargo. This can include, for example, an autonomous tractor optionally coupled to a cargo trailer. Additionally, or alternatively, autonomous platform 110 can be any other type of vehicle such as one or more aerial vehicles, water-based vehicles, space-based vehicles, other ground-based vehicles, etc.

Autonomous platform 110 can be configured to communicate with remote system(s) 160. For instance, remote system(s) 160 can communicate with autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, remote system(s) 160 can provide data indicating tasks that autonomous platform 110 should perform. For example, as further described herein, remote system(s) 160 can provide data indicating that autonomous platform 110 is to perform a trip/service such as a user transportation trip/service, delivery trip/service (e.g., for cargo, freight, items), etc.

Autonomous platform 110 can communicate with remote system(s) 160 using network(s) 170. Network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from autonomous platform 110.

As shown for example in FIG. 1, environment 100 can include one or more objects. The object(s) may be objects not in motion or not predicted to move ("static objects") or object(s) in motion or predicted to be in motion ("dynamic objects" or "actors"). In some implementations, environment 100 can include any number of actor(s) such as, for example, one or more pedestrians, animals, vehicles, etc. The actor(s) can move within the environment according to one or more actor trajectories. For instance, first actor 120 can move along any one of first actor trajectories 122A-C, second actor 130 can move along any one of second actor trajectories 132, third actor 140 can move along any one of third actor trajectories 142, etc.

As further described herein, autonomous platform 110 can utilize its autonomy system(s) to detect these actors (and their movement) and plan its motion to navigate through environment 100 according to one or more platform trajectories 112A-C. Autonomous platform 110 can include onboard computing system(s) 180. Onboard computing system(s) 180 can include one or more processors and one or more memory devices. The one or more memory devices can store instructions executable by the one or more processors to cause the one or more processors to perform operations or functions associated with autonomous platform 110, including implementing its autonomy system(s).

Figure 2:
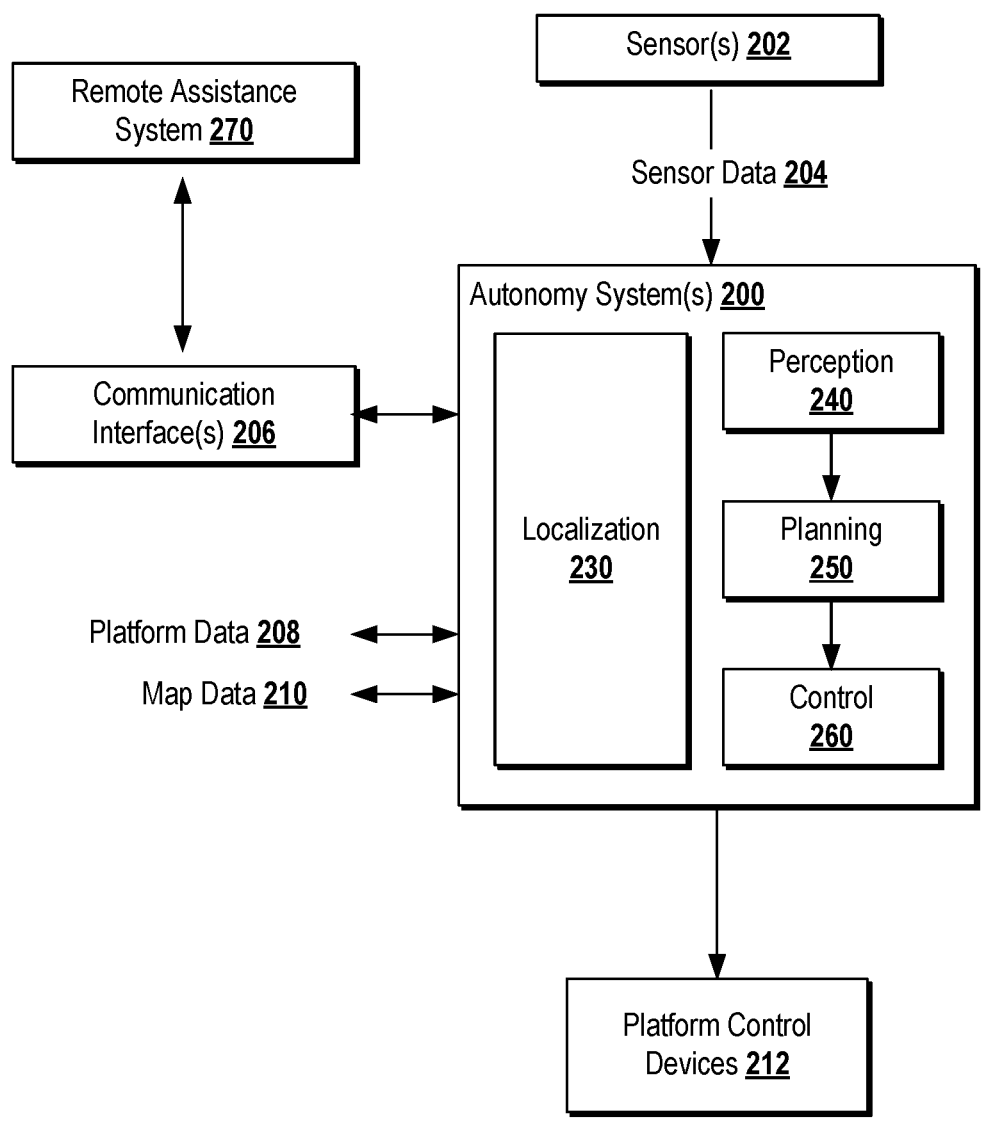
FIG. 2 is a block diagram of an example system, according to some implementations of the present disclosure.

FIG. 2 is a block diagram of an example autonomy system 200 for an autonomous platform, according to some implementations of the present disclosure. In some implementations, autonomy system 200 can be implemented by a computing system of the autonomous platform (e.g., onboard computing system(s) 180 of autonomous platform 110). Autonomy system 200 can operate to obtain inputs from sensor(s) 202 or other input devices. In some implementations, autonomy system 200 can additionally obtain platform data 208 (e.g., map data 210) from local or remote storage. Autonomy system 200 can generate control outputs for controlling the autonomous platform (e.g., through platform control devices 212, etc.) based on sensor data 204, map data 210, or other data. Autonomy system 200 can include different subsystems for performing various autonomy operations. The subsystems may include a localization system 230, a perception system 240, a planning system 250, and a control system 260. Localization system 230 can determine the location of the autonomous platform within its environment; perception system 240 can detect, classify, and track objects and actors in the environment; planning system 250 can determine a trajectory for the autonomous platform; and control system 260 can translate the trajectory into vehicle controls for controlling the autonomous platform. Autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of autonomy system 200 can be shared among its subsystems, or a subsystem can have a set of dedicated computing resources.

In some implementations, autonomy system 200 can be implemented for or by an autonomous vehicle (e.g., a ground-based autonomous vehicle). Autonomy system 200 can perform various processing techniques on inputs (e.g., sensor data 204, map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

Autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: sensors 202, sensor data 204, communication interface(s) 206, platform data 208, or platform control devices 212 for simulating operation of autonomy system 200.

In some implementations, autonomy system 200 can communicate with one or more networks or other systems with communication interface(s) 206. Communication interface(s) 206 can include any suitable components for interfacing with one or more network(s) (e.g., network(s) 170 of FIG. 1, etc.), including, for example, transmitters, receivers, ports, controllers, antennas, or other suitable components that can help facilitate communication. In some implementations, communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, autonomy system 200 can use communication interface(s) 206 to communicate with one or more computing devices that are remote from the autonomous platform (e.g., remote system(s) 160) over one or more network(s) (e.g., network(s) 170). For instance, in some examples, one or more inputs, data, or functionalities of autonomy system 200 can be supplemented or substituted by a remote system communicating over communication interface(s) 206. For instance, in some implementations, map data 210 can be downloaded over a network to a remote system using communication interface(s) 206. In some examples, one or more of localization system 230, perception system 240, planning system 250, or control system 260 can be updated, influenced, nudged, communicated with, etc. by a remote system for assistance, maintenance, situational response override, management, etc.

Sensor(s) 202 can be located onboard the autonomous platform. In some implementations, sensor(s) 202 can include one or more types of sensor(s). For instance, one or more sensors can include image capturing device(s) (e.g., visible spectrum cameras, infrared cameras, etc.). Additionally, or alternatively, sensor(s) 202 can include one or more depth capturing device(s). For example, sensor(s) 202 can include one or more Light Detection and Ranging (LIDAR) sensor(s) or Radio Detection and Ranging (RADAR) sensor(s). Sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of sensor(s) 202 for capturing depth information can be fixed to a rotational device in order to rotate sensor(s) 202 about an axis. Sensor(s) 202 can be rotated about the axis while capturing data in interval sector packets descriptive of different portions of a three-hundred-and-sixty-degree view of a surrounding environment of the autonomous platform. In some implementations, one or more of sensor(s) 202 for capturing depth information can be solid state.

Sensor(s) 202 can be configured to capture sensor data 204 indicating or otherwise being associated with at least a portion of the environment of the autonomous platform. Sensor data 204 can include image data (e.g., 2D camera data, video data, etc.), RADAR data, LIDAR data (e.g., 3D point cloud data, etc.), audio data, or other types of data. In some implementations, autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, autonomy system 200 can obtain sensor data 204 associated with particular component(s) or system(s) of an autonomous platform. This data can indicate, for example, wheel speed, component temperatures, steering angle, cargo or passenger status, etc. In some implementations, autonomy system 200 can obtain sensor data 204 associated with ambient conditions, such as environmental or weather conditions. In some implementations, sensor data 204 can include multi-modal sensor data. The multi-modal sensor data can be obtained by at least two different types of sensor(s) (e.g., of sensors 202) and can indicate static object(s) or actor(s) within an environment of the autonomous platform. The multi-modal sensor data can include at least two types of sensor data (e.g., camera and LIDAR data). In some implementations, the autonomous platform can utilize sensor data 204 for sensors that are remote from (e.g., offboard) the autonomous platform. This can include for example, sensor data 204 captured by a different autonomous platform.

Autonomy system 200 can obtain map data 210 associated with an environment in which the autonomous platform was, is, or will be located. Map data 210 can provide information about an environment or a geographic area. For example, map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, map data 210 can include high-definition map information. Additionally, or alternatively, map data 210 can include sparse map data (e.g., lane graphs, etc.). In some implementations, sensor data 204 can be fused with or used to update map data 210 in real-time.

Autonomy system 200 can include localization system 230, which can provide an autonomous platform with an understanding of its location and orientation in an environment. In some examples, localization system 230 can support one or more other subsystems of autonomy system 200, such as by providing a unified local reference frame for performing, e.g., perception operations, planning operations, or control operations.

In some implementations, localization system 230 can determine a current position of the autonomous platform. A current position can include a global position (e.g., respecting a georeferenced anchor, etc.) or relative position (e.g., respecting objects in the environment, etc.). Localization system 230 can generally include or interface with any device or circuitry for analyzing a position or change in position of an autonomous platform (e.g., autonomous ground-based vehicle, etc.). For example, localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of autonomy system 200 or provided to a remote computing system (e.g., using communication interface(s) 206).

In some implementations, localization system 230 can register relative positions of elements of a surrounding environment of an autonomous platform with recorded positions in map data 210. For instance, localization system 230 can process sensor data 204 (e.g., LIDAR data, RADAR data, camera data, etc.) for aligning or otherwise registering to a map of the surrounding environment (e.g., from map data 210) to understand the autonomous platform's position within that environment. Accordingly, in some implementations, the autonomous platform can identify its position within the surrounding environment (e.g., across six axes, etc.) based on a search over map data 210. In some implementations, given an initial location, localization system 230 can update the autonomous platform's location with incremental re-alignment based on recorded or estimated deviations from the initial location. In some implementations, a position can be registered directly within map data 210.

In some implementations, map data 210 can include a large volume of data subdivided into geographic tiles, such that a desired region of a map stored in map data 210 can be reconstructed from one or more tiles. For instance, a plurality of tiles selected from map data 210 can be stitched together by autonomy system 200 based on a position obtained by localization system 230 (e.g., a number of tiles selected in the vicinity of the position).

In some implementations, localization system 230 can determine positions (e.g., relative or absolute) of one or more attachments or accessories for an autonomous platform. For instance, an autonomous platform can be associated with a cargo platform, and localization system 230 can provide positions of one or more points on the cargo platform. For example, a cargo platform can include a trailer or other device towed or otherwise attached to or manipulated by an autonomous platform, and localization system 230 can provide for data describing the position (e.g., absolute, relative, etc.) of the autonomous platform as well as the cargo platform. Such information can be obtained by the other autonomy systems to help operate the autonomous platform.

Autonomy system 200 can include perception system 240, which can allow an autonomous platform to detect, classify, and track objects and actors in its environment. Environmental features or objects perceived within an environment can be those within the field of view of sensor(s) 202 or predicted to be occluded from sensor(s) 202. This can include object(s) not in motion or not predicted to move (static objects) or object(s) in motion or predicted to be in motion (dynamic objects/actors).

Perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, perception system 240 can determine the state(s) using one or more algorithms or machine-learned models configured to identify/classify objects based on inputs from sensor(s) 202. The perception system can use different modalities of sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

Autonomy system 200 can include planning system 250, which can be configured to determine how the autonomous platform is to interact with and move within its environment. Planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of planning system 250. A motion trajectory can be defined by one or more waypoints (with associated coordinates). The waypoint(s) can be future location(s) for the autonomous platform. The motion plans can be continuously generated, updated, and considered by planning system 250.

Planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

Planning system 250 can determine a desired trajectory for executing a strategy. For instance, planning system 250 can obtain one or more trajectories for executing one or more strategies. Planning system 250 can evaluate trajectories or strategies (e.g., with scores, costs, rewards, constraints, etc.) and rank them. For instance, planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, planning system 250 can utilize static cost(s) to evaluate trajectories for the autonomous platform (e.g., "avoid lane boundaries," "minimize jerk," etc.). Additionally, or alternatively, planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). Planning system 250 can rank trajectories based on one or more static costs, one or more dynamic costs, or a combination thereof. Planning system 250 can select a motion plan (and a corresponding trajectory) based on a ranking of a plurality of candidate trajectories. In some implementations, planning system 250 can select a highest ranked candidate, or a highest ranked feasible candidate.

Planning system 250 can then validate the selected trajectory against one or more constraints before the trajectory is executed by the autonomous platform.

To help with its motion planning decisions, planning system 250 can be configured to perform a forecasting function. Planning system 250 can forecast future state(s) of the environment. This can include forecasting the future state(s) of other actors in the environment. In some implementations, planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally, or alternatively, the probabilities can include probabilities conditioned on trajectory options available to one or more other actors.

In some implementations, planning system 250 can perform interactive forecasting. Planning system 250 can determine a motion plan for an autonomous platform with an understanding of how forecasted future states of the environment can be affected by execution of one or more candidate motion plans. By way of example, with reference again to FIG. 1, autonomous platform 110 can determine candidate motion plans corresponding to a set of platform trajectories 112A-C that respectively correspond to first actor trajectories 122A-C for first actor 120, trajectories 132 for second actor 130, and trajectories 142 for third actor 140 (e.g., with respective trajectory correspondence indicated with matching line styles). For instance, autonomous platform 110 (e.g., using its autonomy system 200) can forecast that a platform trajectory 112A to more quickly move autonomous platform 110 into the area in front of first actor 120 is likely associated with first actor 120 decreasing forward speed and yielding more quickly to autonomous platform 110 in accordance with first actor trajectory 122A. Additionally or alternatively, autonomous platform 110 can forecast that a platform trajectory 112B to gently move autonomous platform 110 into the area in front of first actor 120 is likely associated with first actor 120 slightly decreasing speed and yielding slowly to autonomous platform 110 in accordance with first actor trajectory 122B. Additionally or alternatively, autonomous platform 110 can forecast that a platform trajectory 112C to remain in a parallel alignment with first actor 120 is likely associated with first actor 120 not yielding any distance to autonomous platform 110 in accordance with first actor trajectory 122C. Based on comparison of the forecasted scenarios to a set of desired outcomes (e.g., by scoring scenarios based on a cost or reward), planning system 250 can select a motion plan (and its associated trajectory) in view of the autonomous platform's interaction with environment 100. In this manner, for example, autonomous platform 110 can interleave its forecasting and motion planning functionality.

To implement selected motion plan(s), autonomy system 200 can include a control system 260 (e.g., a vehicle control system). Generally, control system 260 can provide an interface between autonomy system 200 and platform control devices 212 for implementing the strategies and motion plan(s) generated by planning system 250. For instance, control system 260 can implement the selected motion plan/trajectory to control the autonomous platform's motion through its environment by following the selected trajectory (e.g., the waypoints included therein). Control system 260 can, for example, translate a motion plan into instructions for the appropriate platform control devices 212 (e.g., acceleration control, brake control, steering control, etc.). By way of example, control system 260 can translate a selected motion plan into instructions to adjust a steering component (e.g., a steering angle) by a certain number of degrees, apply a certain magnitude of braking force, increase/decrease speed, etc. In some implementations, control system 260 can communicate with platform control devices 212 through communication channels including, for example, one or more data buses (e.g., controller area network (CAN), etc.), onboard diagnostics connectors (e.g., OBD-II, etc.), or a combination of wired or wireless communication links. Platform control devices 212 can send or obtain data, messages, signals, etc. to or from autonomy system 200 (or vice versa) through the communication channel(s).

Autonomy system 200 can receive, through communication interface(s) 206, assistive signal(s) from remote assistance system 270. Remote assistance system 270 can communicate with autonomy system 200 over a network (e.g., as a remote system 160 over network 170). In some implementations, autonomy system 200 can initiate a communication session with remote assistance system 270. For example, autonomy system 200 can initiate a session based on or in response to a trigger. In some implementations, the trigger may be an alert, an error signal, a map feature, a request, a location, a traffic condition, a road condition, etc.

After initiating the session, autonomy system 200 can provide context data to remote assistance system 270. The context data may include sensor data 204 and state data of the autonomous platform. For example, the context data may include a live camera feed from a camera of the autonomous platform and the autonomous platform's current speed. An operator (e.g., human operator) of remote assistance system 270 can use the context data to select assistive signals. The assistive signal(s) can provide values or adjustments for various operational parameters or characteristics for autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist autonomy system 200.

Autonomy system 200 can use the assistive signal(s) for input into one or more autonomy subsystems for performing autonomy functions. For instance, planning subsystem 250 can receive the assistive signal(s) as an input for generating a motion plan. For example, assistive signal(s) can include constraints for generating a motion plan. Additionally, or alternatively, assistive signal(s) can include cost or reward adjustments for influencing motion planning by planning subsystem 250. Additionally, or alternatively, assistive signal(s) can be considered by autonomy system 200 as suggestive inputs for consideration in addition to other received data (e.g., sensor inputs, etc.).

Autonomy system 200 may be platform agnostic, and control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figures 3A, 3B:
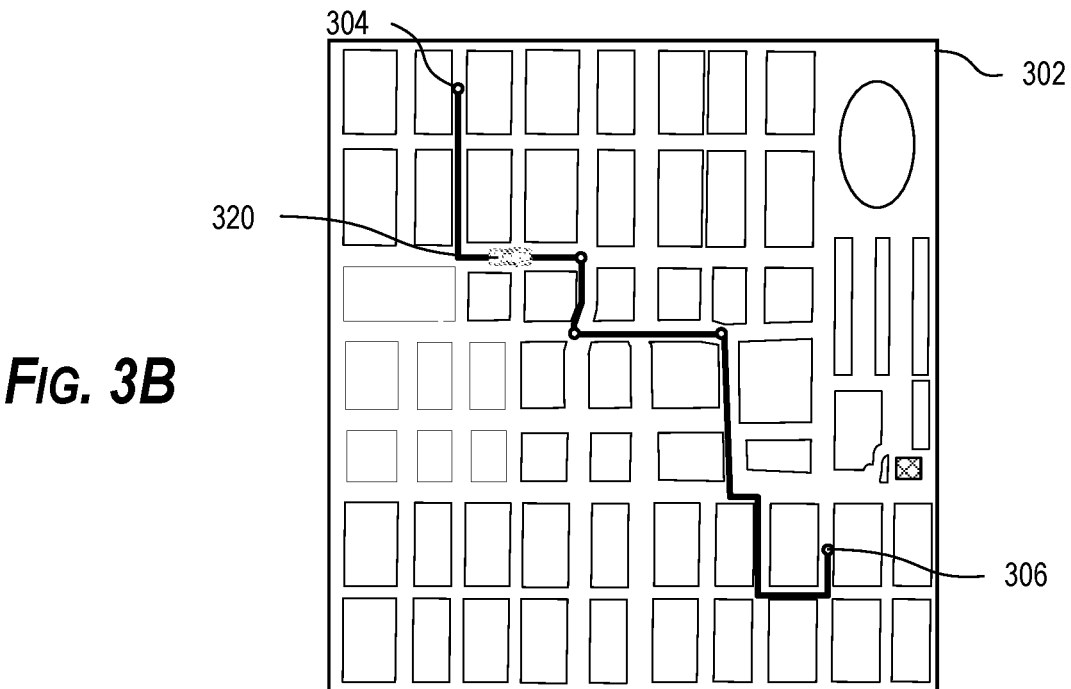
FIG. 3A is a representation of an example operational environment, according to some implementations of the present disclosure.
FIG. 3B is a representation of an example map of an operational environment, according to some implementations of the present disclosure.

For example, with reference to FIG. 3A, an operational environment can include a dense environment 300. An autonomous platform can include an autonomous vehicle 310 controlled by autonomy system 200. In some implementations, autonomous vehicle 310 can be configured for maneuverability in a dense environment, such as with a configured wheelbase or other specifications. In some implementations, autonomous vehicle 310 can be configured for transporting cargo or passengers. In some implementations, autonomous vehicle 310 can be configured to transport numerous passengers (e.g., a passenger van, a shuttle, a bus, etc.). In some implementations, autonomous vehicle 310 can be configured to transport cargo, such as large quantities of cargo (e.g., a truck, a box van, a step van, etc.) or smaller cargo (e.g., food, personal packages, etc.).

With reference to FIG. 3B, a selected overhead view 302 of dense environment 300 is shown overlaid with an example trip/service between a first location 304 and a second location 306. The example trip/service can be assigned, for example, to an autonomous vehicle 320 by a remote computing system. Autonomous vehicle 320 can be, for example, the same type of vehicle as autonomous vehicle 310. The example trip/service can include transporting passengers or cargo between first location 304 and second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
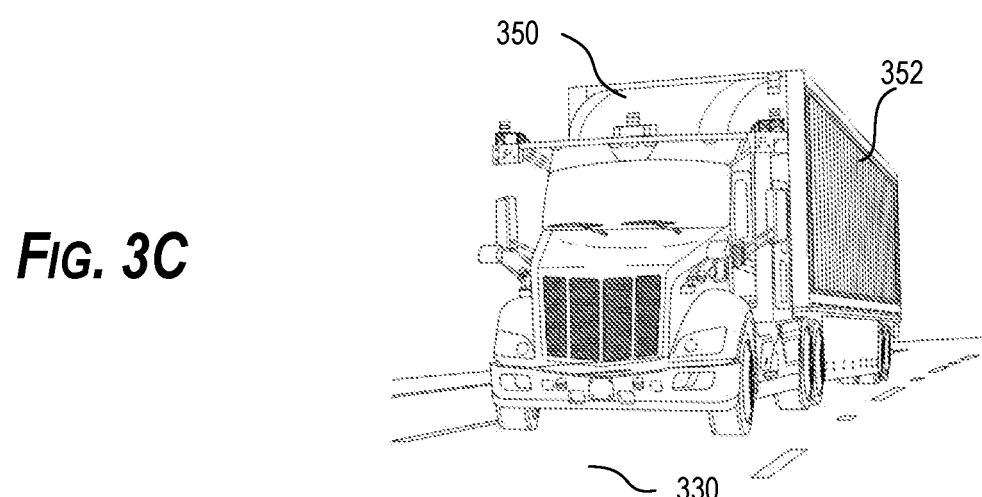
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by autonomy system 200. This can include an autonomous tractor for an autonomous truck. In some implementations, autonomous vehicle 350 can be configured for high payload transport (e.g., transporting freight or other cargo or passengers in quantity), such as for long distance, high payload transport. For instance, autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) autonomous vehicle 350 (e.g., as in a box van, step van, etc.).

Figure 3D:
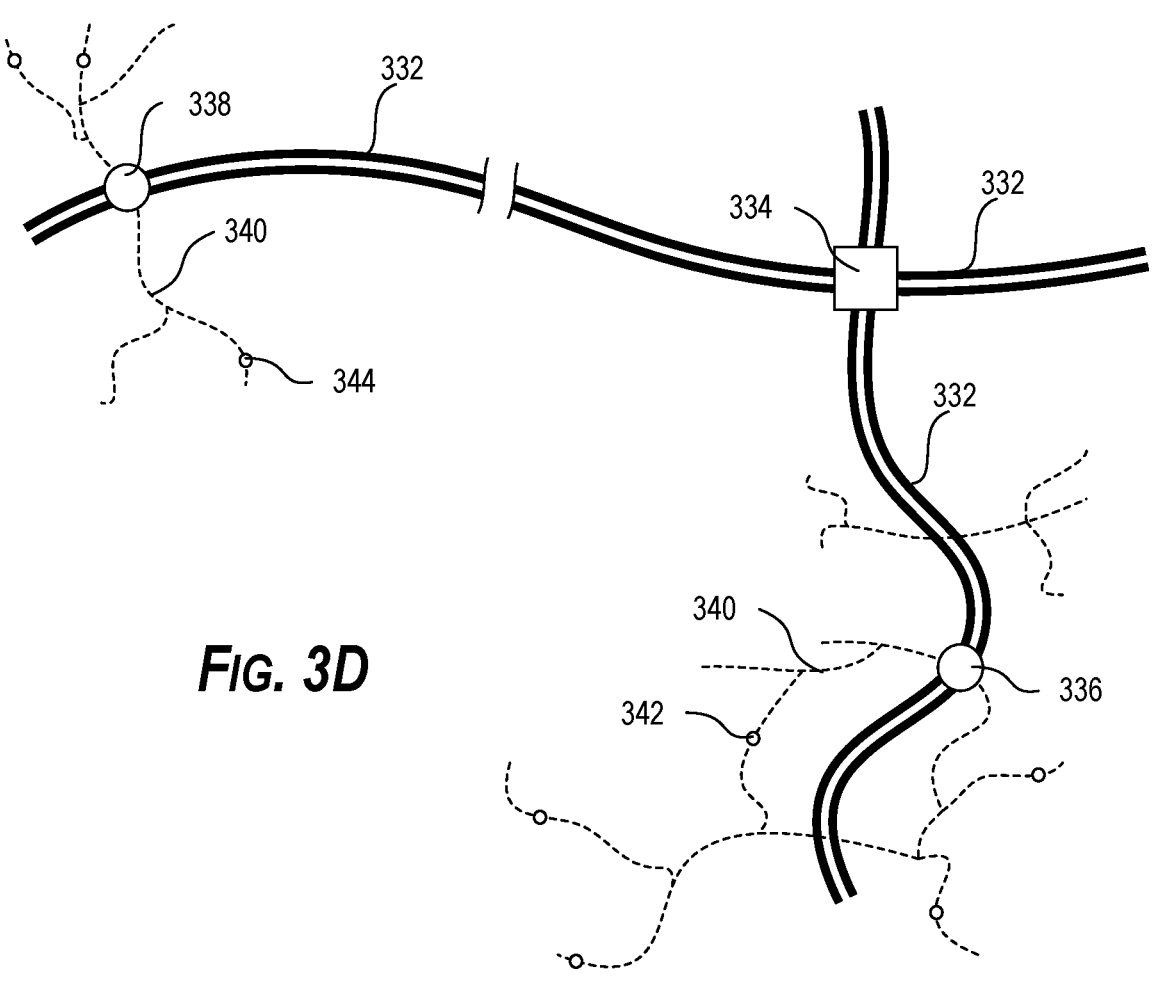
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., autonomous vehicle 310 or autonomous vehicle 350) can be assigned an example trip/service to traverse one or more travel ways 332 (optionally connected by interchange 334) to transport cargo between transfer hub 336 and transfer hub 338. For instance, in some implementations, the example trip/service includes a cargo delivery/transport service, such as a freight delivery/transport service. The example trip/service can be assigned by a remote computing system. In some implementations, transfer hub 336 can be an origin point for cargo (e.g., a depot, a warehouse, a facility, etc.) and transfer hub 338 can be a destination point for cargo (e.g., a retailer, etc.). However, in some implementations, transfer hub 336 can be an intermediate point along a cargo item's ultimate journey between its respective origin and its respective destination. For instance, a cargo item's origin can be situated along access travel ways 340 at location 342. The cargo item can accordingly be transported to transfer hub 336 (e.g., by a human-driven vehicle, by autonomous vehicle 310, etc.) for staging. At transfer hub 336, various cargo items can be grouped or staged for longer distance transport over travel ways 332.

In some implementations of an example trip/service, a group of staged cargo items can be loaded onto an autonomous vehicle (e.g., autonomous vehicle 350) for transport to one or more other transfer hubs, such as transfer hub 338. For instance, although not depicted, it is to be understood that open travel way environment 330 can include more transfer hubs than transfer hubs 336 and 338 and can include more travel ways 332 interconnected by more interchanges 334. A simplified map is presented here for purposes of clarity only. In some implementations, one or more cargo items transported to transfer hub 338 can be distributed to one or more local destinations (e.g., by a human-driven vehicle, by autonomous vehicle 310, etc.), such as along access travel ways 340 to location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the performance of an autonomous platform, such as an autonomous vehicle controlled at least in part using autonomy system 200 (e.g., autonomous vehicles 310 or 350), a computing system can implement a lightweight autonomous system evaluation platform according to aspects of the present disclosure.

Figure 4:
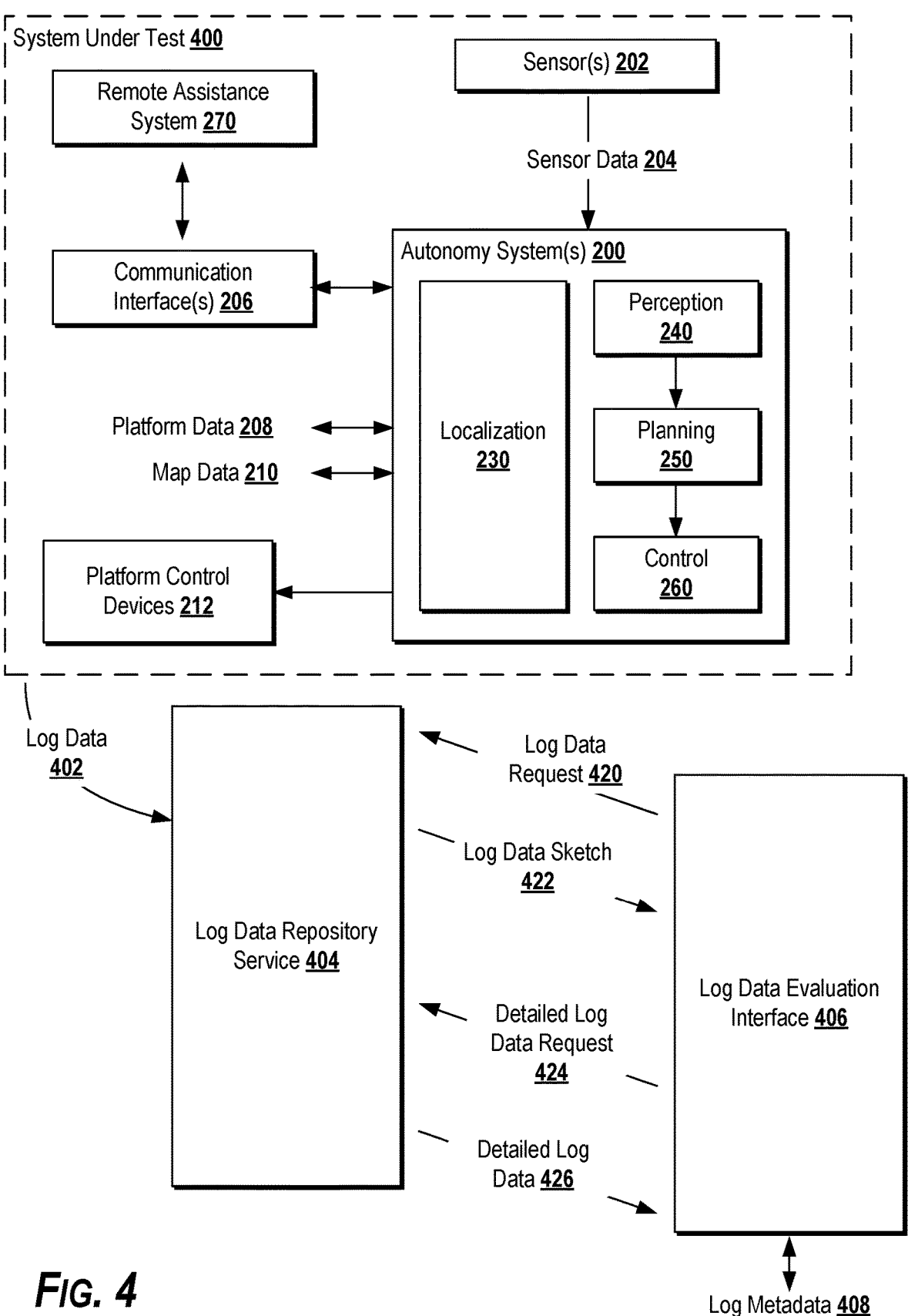
FIG. 4 is a block diagram of an example implementation of a lightweight autonomous system evaluation platform, according to some implementations of the present disclosure.

FIG. 4 is a block diagram of an example implementation of a lightweight autonomous system evaluation platform according to example aspects of the present disclosure. A system under test (SUT) 400 can generate log data 402. A log data repository service 404 can access log data 402 for serving data to a log data evaluation interface 406. Log data evaluation interface 408 can use log metadata 408 to adapt how data is loaded from log data repository service 404. Log data evaluation interface 406 can transmit log data request 420 to log data repository service to request transmission of at least a portion of log data 402. Log data repository service 404 can return log data sketch 422 that contains a lightweight representation of at least a portion of log data 402. Based on an indication of closer inspection of the log data, log data evaluation interface 406 can transmit a detailed log data request 424 to obtain a more detailed representation of log data 402 in at least a portion that is more closely inspected. Responsive to detailed log data request 424, log data repository service 404 can transmit detailed log data 426 to log data evaluation interface 406.

In this manner, for instance, log data sketch 422 can be loaded quickly with low latency, while detailed log data 426 can be loaded later upon closer inspection of areas of log data sketch 422. FIG. 4 illustrates an example implementation of a lightweight autonomous system evaluation platform having various components. It is to be understood that the components can be rearranged, combined, omitted, etc. within the scope of, and consistent with, the present disclosure.

System under test (SUT) 400 can be or include a computing system, one or more computing device(s), or some combination of hardware and software components that perform operations that can be described by log data 402. SUT 400 can generate log data 402 directly, or other system(s) or devices can monitor SUT 400 to generate log data 402.

For example, SUT 400 can include a real or simulated instance of autonomy system 200 or any subsystem thereof. SUT 400 can include one or more real or simulated input and output interfaces with autonomy system 200, including real or simulated instances of sensor(s) 202, communication interface(s) 206, platform control device(s) 212, remote assistance system 270, etc.

SUT 400 can perform designated tests to facilitate collection of log data 402 that describes particular events. SUT 400 can also operate generally (e.g., normal operation, performing other tasks), and log data 402 can be collected incidentally. For instance, a real or simulated instance of an autonomy system 200 can perform a designated task for the purpose of generating log data 402 (e.g., navigating a test course). A real or simulated instance of an autonomy system 200 can perform a task unrelated to any test scenario (e.g., a normal operation scenario, such as performing a transport assignment, etc.), and log data 402 can be generated incidentally for future analysis.

Log data 402 can record or describe a state, an output, an operation, or other data items associated with SUT 400 or a portion thereof. For example, log data 402 can include data associated with real or simulated inputs, outputs, intermediate values, or internal states of autonomy system 200, such as data associated with real or simulated inputs, outputs, intermediate values, or internal states of localization system 230, perception system 240, planning system 250, control system 260, etc. Similarly, log data 402 can include data associated with real or simulated inputs, outputs, intermediate values, or internal states of sensor(s) 202, communication interface(s) 206, platform control device(s) 212, remote assistance system 270, etc. For example, log data 402 can include sensor data 204, platform data 208, map data 210, etc.

Log data 402 can record or describe a state of an environment in which SUT 400 operates. The state of the environment can be described via a state, an output, an operation, or other data items associated with SUT 400 or a portion thereof. Log data 402 can obtain the state of the environment from a source external to SUT 400. For instance, log data 402 can record a first state of the environment from a reference source and a second state of the environment from SUT 400 (e.g., a "ground truth" state and a "perceived" state, respectively). For example, a SUT 400 in a simulation environment can operate based on a set of known inputs. Log data 402 can store these known inputs (or a reference thereto) to maintain a correlation between the known environment state and the state as perceived by SUT 400.

Log data 402 can persist in one or more data formats. Log data 402 can include native data formats from the respective data source(s). Log data 402 can use a common data type or structure across multiple different data source(s). Log data 402 can include compressed data (e.g., lossless or lossy compression).

Log data repository service 404 can facilitate analysis and review of log data 402. Log data repository service 404 can access log data 402 and serve data representative of the contents of log data 402 to one or more endpoints executing log data evaluation interface 406. Log data repository service 404 can orchestrate the processing of log data 402 to obtain log data representations with an amount of detail appropriate for servicing a given log data request.

Log data repository service 404 can include data processing components configured to transform log data 402 into one or more lighter weight representations. Log data repository service 404 can process log data 402 to obtain lower fidelity log data representations (e.g., lower resolution, lower bitrate, lower precision, closer horizons, etc.). Log data repository service 404 can serve the lower fidelity log data representations to decrease latency as appropriate. Log data repository service 404 can serve more detailed representations of log data 402, including the original data itself, as appropriate, such as when a latency budget is higher.

Log data repository service 404 can operate using software executing on one or more computing systems. Log data repository service 404 can operate on computing device(s) of a storage system that stores log data 402. Log data repository service 404 can operate on computing device(s) a computing system that is separate from but communicatively coupled with (e.g., over a network) a storage system that stores log data 402. For instance, a storage system associated with log data repository service 404 can be implemented using a virtual private cloud (VPC), container service, or can be deployed within a public cloud environment. The storage system can include a distributed file system. The storage system can include any system (e.g., database, data lake, etc.) capable of storing log data 402. For instance, the storage system can include block storage, file storage, or object storage. Log data repository service 404 can include software that operates as a back end component that services a front end interface component (e.g., log data evaluation interface 406). For instance, log data repository service 404 can host an API endpoint accessible by log data evaluation interface 406.

Log data repository service 404 can prepare log data 402 for rendering on log data evaluation interface 406. For instance, log data 402 can include compressed data (e.g., for efficient storage) or raw data not suitable for rendering (e.g., not-yet demosaiced image sensor data). Log data repository service 404 can process log data 402 to prepare representations for rendering by log data evaluation interface 406. Log data repository service 404 can prepare representations based on expected usage. For instance, log data repository service 404 can predict (e.g., using a machine-learned model) a likelihood of use of a particular log data item. Based on the likelihood of use being above a target value, log data repository service 404 can prepare and store/cache a representation thereof. This can be performed online or offline. For instance, log data repository service 404 can prepare representations offline for future serving. Log data repository service 404 can prepare representations online on-demand or in anticipation of imminent demand (e.g., based on a short term demand forecasting model, such as a model that ingests the immediate context of a log data evaluation interface 406, and data rendered thereby, to predict likely next resources to be served to log data evaluation interface 406).

Log data evaluation interface 406 can operate on one or more endpoint computing devices that can be the same or different from device(s) operating log data repository service 404. For instance, log data evaluation interface 406 can operate on a client computing device that is in a client-server relationship with a server computing device operating log data repository service 404.

Log data evaluation interface 406 can be or include a computer program or application that renders representations of log data 402 on a user interface device of a computing endpoint. Log data evaluation interface 406 can be or include an application that leverages an API endpoint to communicate with log data repository service 404. Log data evaluation interface 406 can be a web-based application. Log data evaluation interface 406 can operate over a network, such as over the internet. Log data evaluation interface 406 can interact with one or more input and output devices associated with a computing endpoint. In this manner, for instance, log data evaluation interface 406 can render information to display device(s) and receive inputs from input device(s).

Log metadata 408 can describe a configuration of retrieval and presentation of representation(s) of log data 402. Log metadata 408 can include a manifest of resources associated with log data 402. Log metadata 408 can include user-specific or endpoint-specific configurations for retrieval and presentation of representation(s) of log data 402. Log metadata 408 can be, for instance, a JSON formatted file.

For instance, log metadata 408 can encode customization preferences for loading data from log data repository service 404. For instance, log metadata 408 can indicate that the current instance of log data evaluation interface 406 is operating for a particular task. Different types of log data can be more or less important for performing the particular task. Different amounts of detail may be useful for different types of log data for performing the particular task as compared to other tasks. Accordingly, log data evaluation interface 406 can use log metadata 408 to request a log data sketch 422 or detailed log data 426 that is adapted to the current task. For instance, a mapping task that uses log data to build or refine world maps can be associated with a lower priority for data describing moving objects and a higher priority for data describing fixed environmental features. Likewise, a motion planning development task can be associated with a lower priority for data describing fixed environmental features beyond a certain distance from a roadway and a higher priority for data describing moving objects in a roadway.

Log metadata 408 can include a data manifest associated with log data 402 that describes available resources associated with log data 402. The available resources can be associated with different levels of detail or data sizes. Log data evaluation interface 406 can determine, from log metadata 408, a resource associated with a desired level of detail corresponding to the requested log data. Log data evaluation interface 406 can retrieve, from log data repository service 404, a resource containing the desired level of detail (e.g., a lightweight log data sketch 422, detailed log data 426, etc.).

Log metadata 408 can describe relationships between portions of log data 402. Log metadata 408 can describe relationships between, for instance, sensor data and annotations or metrics descriptive thereof. Log metadata 408 can include a tree or graph structure that describes what resources are available in log data 402 and the relationship(s) between resources.

Log data request 420 can include a message generated by log data evaluation interface 406 for retrieval of a representation of log data 402. For instance, log data evaluation interface 406 can receive an input that indicates an identifier associated with log data 402. Log data evaluation interface 406 can transmit log data request 420 to cause log data repository service 404 to serve data representing log data 402.

Log data request 420 can retrieve data associated with one or more indexing parameters (e.g., a range of one or more index values for the indexing parameter(s)). Log data 402 can be indexed across a number of various indexing parameters. An indexing parameter can correspond to a time value at which log data 402 was recorded or for which log data 402 provides description. An indexing parameter can correspond to a location, a data type, a vehicle identifier, a vehicle type class, a sensor identifier or type class, a software version identifier of one or more software components used by SUT 400, etc. Any one or more data types or values in log data 402 can be used as an indexing parameter to retrieve data representing log data 402.

Log data sketch 422 can include data representing log data 402. Log data sketch 422 can include a lightweight representation of log data 402. Log data sketch 422 can be lower fidelity than the original log data 402. For instance, log data sketch 422 can include downsampled data, resized data, subsampled data, reduced bitrate data, reduced bit depth data, clipped data, lossy compressed data, etc.

Fidelity reduction can leverage a wide range of techniques. Some techniques can include learned compression techniques. For instance, a machine-learned model can process log data 402 to generate a reduced-size representation that retains salient information. For instance, a machine-learned model can generate reduced-size log data representations that maintain a perceptual similarity to the original log data.

Such machine-learned models can be trained for improved performance on various tasks. For instance, a machine-learned model for generating reduced-size log data representations for labeling purposes can be trained to maintain extrema of object representations to facilitate more accurate boundary labeling. For a given task, a machine-learned model can be trained to generate reduced-size log data representations for that task while retaining attributes of importance for that task. This training can include a learning loop that includes an objective based on, for example, corrections applied to outputs of the task (e.g., labeled data) when compared against the original log data.

Log data sketch 422 can include generated primitives that represent the raw log data 402. For example, log data sketch 422 can include a vector representation of a curve in lieu of a series of raster points or bitmap data in the original log data 402. Similarly, log data sketch 422 can include surfels, polygons, or mesh representations of objects in lieu of the raw point cloud data associated with those objects from the original log data 402.

Log data sketch 422 can include data items selected to fill a given data budget or latency budget. For instance, a system (e.g., log data repository service 404, log data evaluation interface 406) can determine a connection speed and determine a data budget or latency budget for serving log data sketch 422. Log data sketch 422 can be built to prioritize expenditure of the budget(s) on more relevant data. Data relevancy can be determined from explicit annotations or learned rankings of data items or data types. A system (e.g., log data repository service 404, log data evaluation interface 406) can optimize a balance between including more types of data and including more detailed data for each type. This can be optimized in a machine-learning loop based on an objective that includes, for instance, human feedback received via a feedback interface. Other objectives can include decreasing a likelihood of a request for additional data, decreasing a latency, a weighted combination thereof, etc.

Log data repository service 404 can retrieve or generate log data sketch 422 in response to log data request 420. Log data evaluation interface 406 can identify resources to include in log data sketch 422 (e.g., using log metadata 408) and request the resources from log data repository service 404. Log data sketch 422 can include previously generated or dynamically generated data. Log data sketch 422 can include data designated as lightweight data to serve first to reduce a rendering latency at log data evaluation interface 406. Log data sketch 422 can include lightweight data generated dynamically responsive to log data request 420.

Detailed log data request 424 can include a request for a more detailed representation (e.g., higher fidelity) representation of log data 402 as compared to log data sketch 422. Log data evaluation interface 406 can transmit detailed log data request 424 responsive to determining an inspection indicator. Detailed log data request 424 can include the inspection indicator. For instance, log data evaluation interface 406 can receive an input indicating that a portion of log data sketch 422 is subject to closer inspection. The portion can correspond to one or more index values.

The inspection indicator can be based on an input that selects a portion of log data for closer inspection (e.g., zooming, cropping, selecting with a boundary, lasso select, double or single click, tap, pinch/expand gesture, etc.). This input can be explicit or implicit. An example explicit input indicating closer inspection can be a zoom input. An implicit input indicating closer inspection can be a scroll or pan input that changes rate when a particular portion of the displayed data is visible in a viewport. Log data evaluation interface

406 can infer that the visible portion of the data is subject to closer inspection and can initiate fetching additional detail for display.

Similarly, the inspection indicator can be based on a timeline scrubbing input or other temporal or spatial scrolling input where a rate change can indicate closer inspection of a particular spatial or temporal subdivision of the displayed data. For instance, a slider on a timeline interface can correspond to a timeline describing log data over time. An input corresponding to a dragging of the slider can cause log data evaluation interface 406 to update the visible data to data that is indexed to a timestamp associated with a current position of the slider on the timeline interface. To facilitate low-latency scrubbing through the log data, log data evaluation interface 406 can quickly load lightweight data representations to give an initial look at the log data, while additional detail can be fetched as the slider motion slows or pauses completely.

Similarly, an inspection indicator can be based on a predetermined input configuration. For instance, an input to log data evaluation interface 406 can indicate that a recording of log data is to be played back at a particular playback speed. Based on the particular playback speed, the log data can be loaded with different levels of detail (e.g., different framerates, different detail densities for one or more datatypes, etc.). For instance, a first playback speed can be associated with a first amount of detail (e.g., a first bitrate budget). A second, faster playback speed can be associated with a second, lesser amount of detail (e.g., a second bitrate budget less than the first bitrate budget). A third, slower playback speed can be associated with a third, greater amount of detail (e.g., a third bitrate budget greater than the first bitrate budget).

Detailed log data request 424 can include or omit the inspection indicator. In an example, detailed log data request 424 can include an inspection indicator, and log data repository service 404 can process the inspection indicator (and, e.g., log metadata 408) to serve a resource containing additional detail. In an example, log data evaluation interface 406 can process the inspection indicator to request the resource directly. For instance, the determination of what additional data is needed can be performed by log data evaluation interface 406 based on the inspection indicator and log metadata 408.

Detailed log data 426 can include a higher fidelity representation of log data 402. Detailed log data 426 can include the original data from log data 402. Detailed log data 426 can include higher-quality representations that are lower quality than the original data. For example, log data sketch 422 can include a first set of subsampled data points, and detailed log data 426 can include a second set of subsampled data points that were subsampled at a higher frequency. For example, log data sketch 422 can include a generated primitive that represents a dense set of original data, and detailed log data 426 can include the dense set of original data (or a subsampled version thereof).

Detailed log data 426 can include different data than log data sketch 422. For instance, detailed log data 426 can include additional data types that were omitted from log data sketch 422. For example, log data sketch 422 can include a first set of data types configured to facilitate rapid initial understanding or processing of a subject scenario. Detailed log data 426 can include a second, larger set of data types that is configured to provide a clearer or fuller picture of the subject scenario.

Detailed log data 426 can include metadata associated with log data 402. For instance, a bounding box around a detected actor can be presented in log data sketch 422. A user can interact with the bounding box (e.g., selecting, hovering over, etc.). Input data corresponding to the interaction can be an inspection indicator. Based on this inspection indicator, metadata associated with the detected actor can be loaded and displayed. For instance, detailed log data 426 can include metrics describing a motion or other characteristics of the actor.

Log data repository service 404 can include a machine-learned demand forecasting system configured to learn from data consumption patterns to improve the preparation and service of log data representations. For instance, log data repository service 404 can include a machine-learned model that forecasts what data is likely to be inspected in detail. Log data repository service 404 can use the forecast to queue and preprocess the corresponding log data to prepare a representation containing greater detail. This forecasting can be performed in real time. The forecasting model can ingest real-time context of a user session (e.g., where a user clicks, where a cursor hovers, what data items are selected, gesture patterns, gaze tracking, etc.) with log data evaluation interface 404 and forecast what data is likely to be requested within a horizon (e.g., next few seconds, next few minutes, etc.). The forecasting model can be trained in a self-supervised manner using an objective, for example, that evaluates model predictions against actual data requests from log data evaluation interface 406. In this manner, for instance, log data repository service 404 can anticipate what data is likely to be requested and prepare to serve the data just in time.

Patterns of data consumption over time can also guide operation of log data repository service 404. For instance, log data repository service 404 can learn that particular data items are most likely to be inspected in detail. Log data repository service 404 can thus prioritize data budgets for representing those data items in more detail (e.g., in log sketch(es) 422, detailed log data 426, etc.).

Log data repository service 404 can prioritize service of different data types or different data densities. Log data repository service 404 can prioritize service of the different data types or different data densities according to a multi-tier structure. For example, a tiered framework can contain data tiers based on service speed, such as a rapid response data tier for rapid service within a low latency budget or within a low data rate budget, one or more intermediate data tiers for service within a higher latency budget or within a higher data rate budget, and one or more detailed data tiers for service within a higher latency budget or within a higher data rate budget. The data tiers can be prepopulated with preprocessed data or can be populated with cached data that is dynamically generated for various requests.

Figure 5:
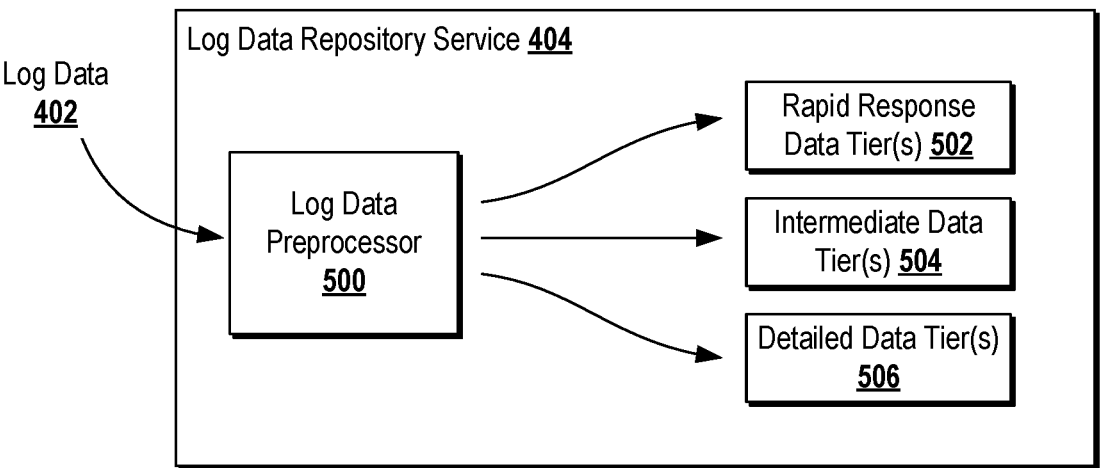
FIG. 5 is a block diagram of an example implementation of a lightweight autonomous system evaluation platform, according to some implementations of the present disclosure.

FIG. 5 is a block diagram of an example implementation of log data repository service 404 that uses a log data preprocessor 500 to process log data 402 into rapid response data tier(s) 502, intermediate data tier(s) 504, and detailed data tier(s) 506. FIG. 5 illustrates an example implementation with various components. It is to be understood that the components can be rearranged, combined, omitted, etc. within the scope of, and consistent with, the present disclosure.

A data tier (e.g., rapid response data tier(s) 502, intermediate data tier(s) 504, detailed data tier(s) 506, etc.) can be or correspond to a portion of log data 402 that is associated with a particular priority level or service order designation. A data tier can be an explicit structure that stores data that is designated to the tier. A data tier can be the designation itself, such as a data record that records a designation for portions of log data 402 or representations thereof. The designation can be part of log data 402. The designation can persist in a separate table that associates various data types with different tiers.

The designation of data to a particular tier can be granular, such as specific to a particular data item (e.g., file, record, etc.). The designation can be broader, such as applying to data items of a particular type (e.g., point cloud data, image data, etc.). The designation can filter across multiple different categories. For instance, a tier designation can apply to image data from one sensor differently from image data from another sensor.

The designation of data to a particular tier can vary based on an operational context. For instance, different data may be prioritized differently for different tasks. A tier designation can thus vary for the same data item(s) based on a task being performed. A given portion of log data 402 or a representation thereof can thus be associated with multiple different tiers respectively in different contexts. For instance, a given portion of log data 402 or a representation thereof can be associated with multiple different combinations of tasks and tiers.

Log data repository system 404 can store references to log data 402 in association with a given tier. Log data repository system 404 can store representations of log data 402 within storage associated with a given tier. Log data repository system 404 can store representations of log data 402 with a reference to a given tier, such that log data repository system 404 can retrieve data associated with the given tier based on the tier reference value.

Log data preprocessor 500 can assign a data item (e.g., a given portion of log data 402 or a representation thereof) to a tier based on one or more characteristics of the data item. A data item can be assigned to a tier based on a size of the data item, a bitrate of the data item, a compressibility of the data item, etc. For example, log data 402 can include a set of data values. Log data preprocessor 500 can process the set of data values into a lightweight representation and store the lightweight representation in association with rapid response data tier 502 based on a size characteristic of the lightweight representation. Log data preprocessor 500 can process the set of data values into a more detailed representation and store the more detailed representation in association with one of intermediate data tier(s) 504 based on a size characteristic of the more detailed representation. Log data preprocessor 500 can process the set of data values into a highly detailed representation and store the highly detailed representation in association with detailed data tier 506 based on a size characteristic of the highly detailed representation.

Log data preprocessor 500 can associate a data item (e.g., a given portion of log data 402 or a representation thereof) to a tier based on a configuration schema (e.g., a configuration file or other record). For example, a configuration schema can indicate a prioritization of different data types or other categories of data. For instance, a configuration schema can indicate that data of a certain type is to be served first and should be assigned to rapid response data tier 502. The configuration schema can indicate a resolution or other detail specification at which the data should be served in rapid response data tier 502. The configuration schema can indicate that data of a certain type can be served with some delay or upon closer inspection and should be assigned to intermediate data tier(s) 504 or detailed data tier(s) 506. The configuration schema can indicate a resolution or other detail specification at which the data should be served in the corresponding tier(s).

The configuration schema can be based on configuration inputs received from one or more development systems associated with the data sources. For instance, a data source of SUT 400 can be a software, firmware, or hardware component that corresponds to a development system that is used for developing the software, firmware, or hardware component. The development system can output a configuration file that identifies, for different types of data output by the data source, various levels of priority for the different types of data.

For example, SUT 400 can include a motion planner (e.g., planning system 250). A motion planner can generate voluminous log data that documents the inputs received by the motion planner and the decision-making steps executed to arrive at a particular output plan. Some of the log data can be more relevant or useful than other parts of the log data. A motion planning engineer can identify the relative priority of different parts of the log data. The engineer can interact with a development computing system to input priority data for different parts of the log data. The development computing system can receive input data indicating priority data for different parts of the log data and output the input data to a configuration schema. A configuration schema can contain similar priority data for other components of SUT 400.

Log data preprocessor 500 can process log data 402 based on the configuration schema by determining whether a data item in log data 402 is associated with a tier by the configuration schema. For data that is associated with a tier (e.g., assigned to a priority level that is mapped to a tier), log data preprocessor 500 can assign the data item accordingly.

Different data tiers can contain different level of detail associated with a given slice of log data 402 (e.g., associated with a particular index value). For example, log data 402 can include a set of data values that are associated with an index value (e.g., a timestamp). Log data preprocessor 500 can process the set of data values into a lightweight representation and store the lightweight representation in association with rapid response data tier 502. Log data preprocessor 500 can process the set of data values into a more detailed representation and store the more detailed representation in association with one of intermediate data tier(s) 504. Log data preprocessor 500 can process the set of data values into a highly detailed representation and store the highly detailed representation in association with detailed data tier 506.

Different data tiers can contain different data associated with a given slice of log data 402 (e.g., associated with a particular index value). For example, rapid response data tier 502 can include a first set of data that includes a first set of data types (e.g., generated primitives for rapid loading, data from a subset of available sensors, etc.). Intermediate data tier(s) 504 can include a second set of data that includes a second set of data types (e.g., generated primitives and data from a larger set of sensors, etc.). Detailed data tier(s) 506 can include a third set of data that includes a third set of data types (e.g., no generated primitives, data from all sensors).

Rapid response tier 502 can include low fidelity data. Rapid response tier 502 can include full fidelity data. Rapid response tier 502 can be associated with a data budget or latency budget, and the data items associated with rapid response tier 502 can be selected to remain within the budget. For instance, rapid response tier 502 can be associated with an allowed bitrate. The allowed bitrate can be allocated differently among different data types. Based on a priority of a particular data type, that particular data type can be represented with higher fidelity than a different data type with lower priority. In this manner, for instance, a relative priority between data types can determine an allocation of available bitrate within rapid response data tier 502. Similarly, a latency budget can be allocated among data within a tier. Log data repository service 404 can allocate a latency budget by determining a connection speed over which the data is to be served and determining an amount of data that can be served within the latency budget. This amount of data can be allocated among data types in rapid response data tier 502 to determine a fidelity of data to be served. This determination can occur offline for a number of expected connection speeds, and a corresponding rapid response tier can be generated for the expected connection speeds. Based on the speed, the allocation may differ. For instance, high priority data may require a minimum amount of data to provide a useful view of the log data. Instead of proportionally shrinking the allocated data budget for the high priority data, log data repository service 404 can reduce the budget allocated for other data types (e.g., reducing even up to omitting other data types).

Rapid response data tier 502 can contain data to send in log data sketch(es) 422. Intermediate data tier(s) 504 and detailed data tier(s) 506 can contain data to send in detailed log data 426. Choice between the tier(s) can be based on available data bandwidth, a latency budget, task type, configuration preferences, etc.

Log data preprocessor 500 can include one or more machine-learned components. For instance, log data preprocessor 500 can receive a feedback signal from log data evaluation interface 406 regarding the content or timeliness of the data delivered to log data evaluation interface 406. Based on this feedback, log data preprocessor 500 can update one or more components for tier assignment, data subsampling, data clipping, etc. to improve the feedback signal.

Figure 6:
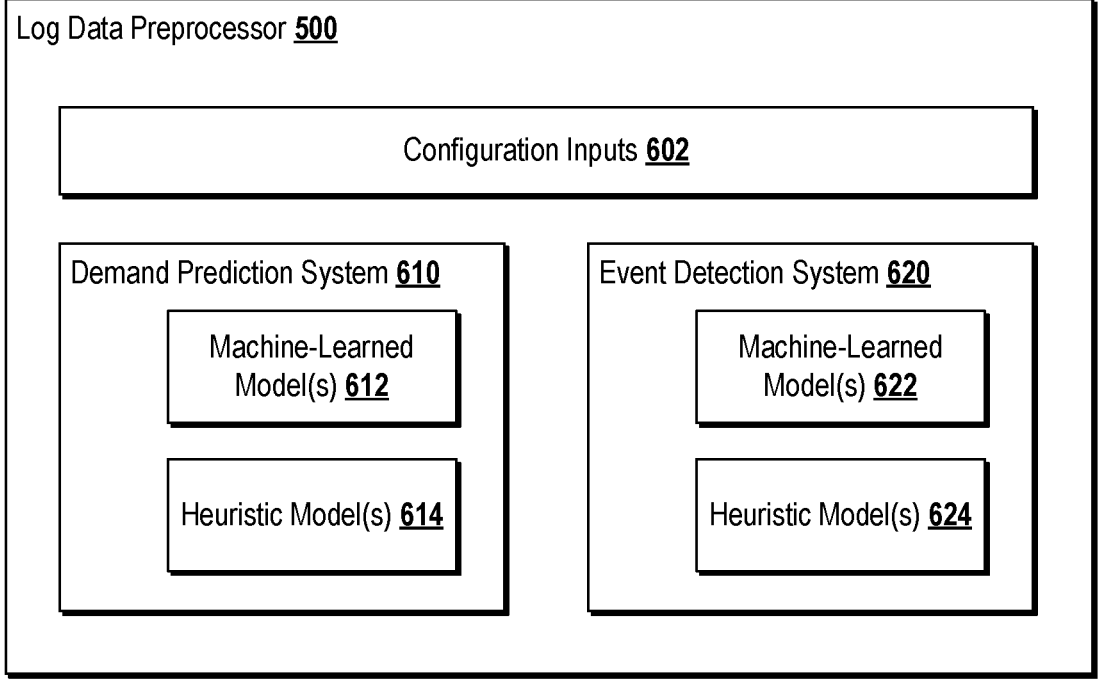
FIG. 6 is a block diagram of an example implementation of a lightweight autonomous system evaluation platform, according to some implementations of the present disclosure.

FIG. 6 is a block diagram of an example implementation of log data preprocessor 500. Configuration inputs 602 can guide or control how log data is preprocessed. A demand prediction system 610 can process log data 402 to predict what aspects of log data 402 are likely to be retrieved for evaluation, and in what level of detail they are likely to be desired (e.g., using machine-learned model(S) 612 or heuristic model(s) 614). An event detection system 620 can process log data 402 cooperatively with or independently of demand prediction system 610 to identify salient portions of log data 402 (e.g., using machine-learned model(s) 622 or heuristic model(s) 624). FIG. 6 illustrates an example implementation with various components. It is to be understood that the components can be rearranged, combined, omitted, etc. within the scope of, and consistent with, the present disclosure.

Configuration inputs 602 can include a configuration schema, such as a configuration schema described above with respect to FIG. 5. Configuration inputs 602 can include user configuration data associated with one or more endpoint device(s). For instance, individual users or teams of users can correspond to different configuration files that configure different prioritizations of data in log data 402.

Demand prediction system 610 can predict a demand for data (and a level of detail corresponding thereto) in log data 402. Demand prediction system 610 can process log data 402 and determine portions that are likely to be requested from a log data evaluation interface in greater detail. Demand prediction system 610 can ingest log data 402 as well as other context, such as context of various upcoming tasks that might request representations of log data 402. For instance, upcoming tasks can be monitored from a task queue.

Demand prediction system 610 can include one or more machine-learned models 612. Machine-learned models 612 can be trained to process a portion of log data and predict a likelihood that the portion will be requested. Machine-learned models 612 can be trained to process a portion of log data and output subportion(s) (or identifier(s) thereof) that are most likely to be requested. Machine-learned model(s) 612 can be trained based on various objectives, including an objective based on minimizing a maximum latency for a session, minimizing cumulative latency, minimizing a delay from first request to first rendering of data, improving a feedback signal from a human feedback interface, etc.

Demand prediction system 610 can include one or more heuristic model(s) 614. A heuristic model can include a rules-based decision-making algorithm that is engineered to deterministically achieve particular outcomes. For example, a heuristic model 614 can include a rule that a particular set of data types are considered to be high demand data types. For example, if it is known that a particular set of data types are always used in a particular workflow, then hard-coding that rule in a heuristic model 614 can spare the computational effort of repeatedly predicting that likelihood using machine-learned model(s) 612.

Event detection system 620 can be part of or separate from demand prediction system 610. Event detection system 620 can be trained to process log data and identify portions of the log data that describe events of interest. For instance, determining an event of interest can include recognizing an event as similar to a preconfigured set of events of interest (e.g., sensor malfunctions, high-cost maneuvers, simulation failures, etc.). Recognition can proceed based on explicit comparison against event(s) of interest (e.g., in an embedding space) or implicit comparison by leveraging knowledge of events of interest encoded in parameters of event detection system 620.

Event detection system 620 can include one or more machine-learned model( ) 622. Machine-learned models 622 can be trained to process a portion of log data and output subportion(s) (or identifier(s) thereof) that are most likely to indicate an event of interest. Machine-learned model(s) 622 can be trained based on various objectives, including a supervised objective based on labeled log data that depicts events of interest. For instance, in this manner machine-learned models 622 can implicitly use a set of events of interest—as reflected in a training data set—to predict other events of interest.

Event detection system 620 can include one or more heuristic model(s) 624. For example, a heuristic model 624 can be keyed to event flags in log data 402. For instance, SUT 400 can itself notate when various events occur, such as sensor malfunctions, etc. A heuristic model 624 can determine an event occurrence based on one or more such deterministic indicators.

Output(s) of demand prediction system 610 or event detection system 620 can cause one or more portions of log data 402 to be processed into one or more data tiers. For example, log data repository service 404 can selectively determine what portions of log data 402 to preprocess offline based on the outputs of demand prediction system 610 or event detection system 620. In this manner, for instance, the system can deprioritize using computational resources to process and store representations of log data with a low likelihood of being accessed.

Log data preprocessor 500 can use output(s) of demand prediction system 610 or event detection system 620 for determining how many representations of a given portion of data to generate. For instance, for data with some likelihood of being viewed but a relatively low likelihood of being inspected in detail, log data preprocessor 500 can generate a lightweight representation for including in a log data sketch 422. Log data preprocessor 500 can omit generating more detailed representations (at least initially), because it can be unlikely that more detailed representations will be retrieved upon further inspection for that particular data. For data with a higher likelihood of being inspected in detail, log data preprocessor 500 can generate a lightweight representation for including in a log data sketch 422 and a more robust representation for including in detailed log data 426.

Log data preprocessor 500 can use output(s) of demand prediction system 610 to prioritize or rank data in log data 402. Log data preprocessor 500 can use output(s) of demand prediction system 610 to determine a default data rate (e.g., a sample or framerate) to use when representing the data in a log data sketch or a detailed log data set. For instance, data describing events of interest can be rendered in a sketch with higher frame/sample rates. Other data within the sketch can be deprioritized to compensate (e.g., other data not directly descriptive of the event of interest, such as background data, etc.).

Figure 7A:
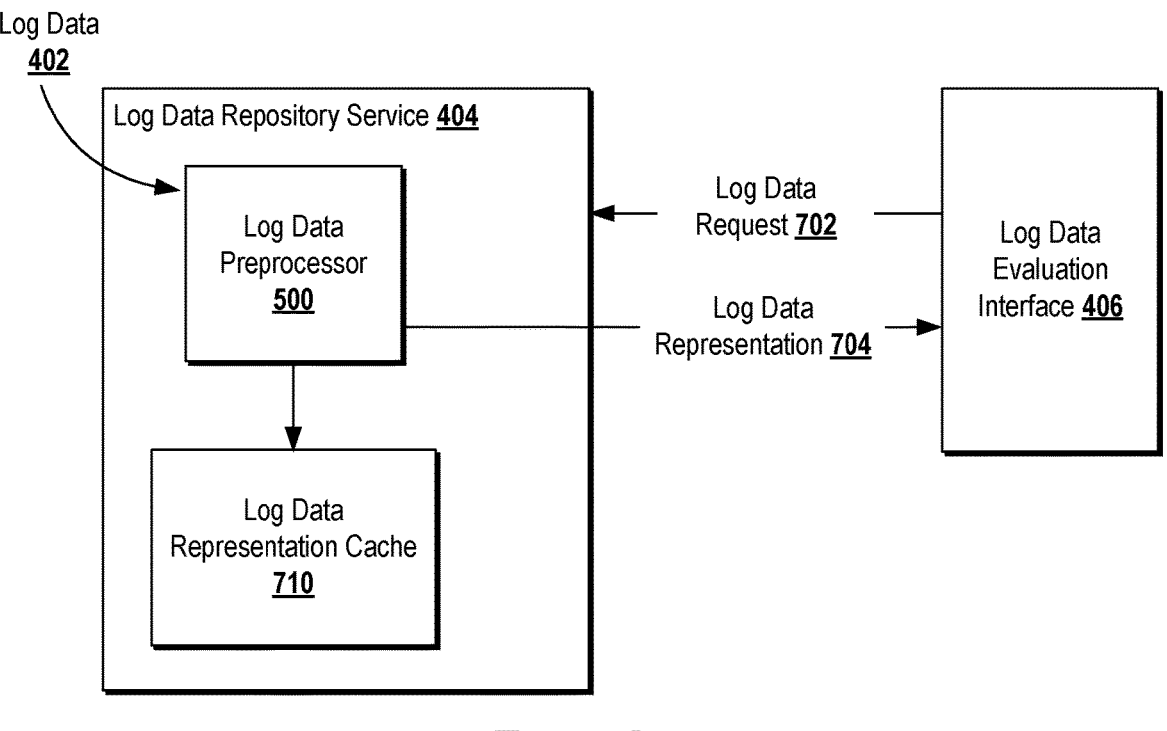
FIG. 7A is a block diagram of an example implementation of a lightweight autonomous system evaluation platform, according to some implementations of the present disclosure.

FIG. 7A is a block diagram of an example implementation of log data preprocessor 500. FIG. 7A illustrates an example implementation with various components. It is to be understood that the components can be rearranged, combined, omitted, etc. within the scope of, and consistent with, the present disclosure.

Log data preprocessor 500 can preprocess log data 402 in an online or offline manner. For instance, log data preprocessor 500 can preprocess log data 402 online, responsive to receiving a log data request 702, to generate a log data representation 704. Log data representation(s) 704 generated online can be stored in a log data representation cache 710 and associated with a corresponding tier to cache the representations for servicing future requests. For instance, to service future requests that request the same data as log data request 702, log data repository service can fetch log data representation 704 from log data representation cache 710.

Log data representation cache 710 can maintain data for a period of time. The period of time can be indefinite or limited. For instance, cached data can expire and be purged after 7 days, 30 days, etc. without use/retrieval.

Figure 7B:
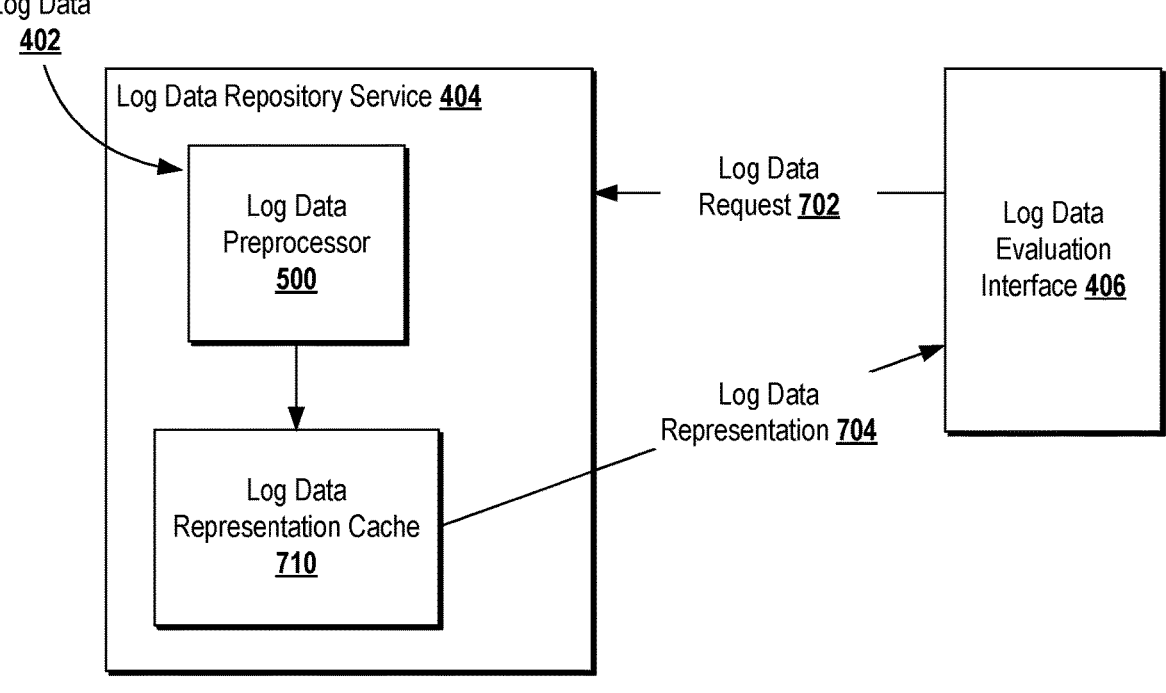
FIG. 7B is a block diagram of an example implementation of a lightweight autonomous system evaluation platform, according to some implementations of the present disclosure.

FIG. 7B is a block diagram of an example implementation of log data preprocessor 500. FIG. 7B illustrates an example implementation with various components. It is to be understood that the components can be rearranged, combined, omitted, etc. within the scope of, and consistent with, the present disclosure.

Log data preprocessor 500 can preprocess log data 402 offline to store representations in log data representation cache 710 in association with a corresponding tier for serving future requests or previously-submitted queued requests. Log data repository service 404 can receive log data request 702 at a later time and output log data representation 704 from log data representation cache 710.

Log data repository service 404 can maintain one or more caches which can store the same or different data. The caches can form or be a part of a content distribution network.

Figure 8:
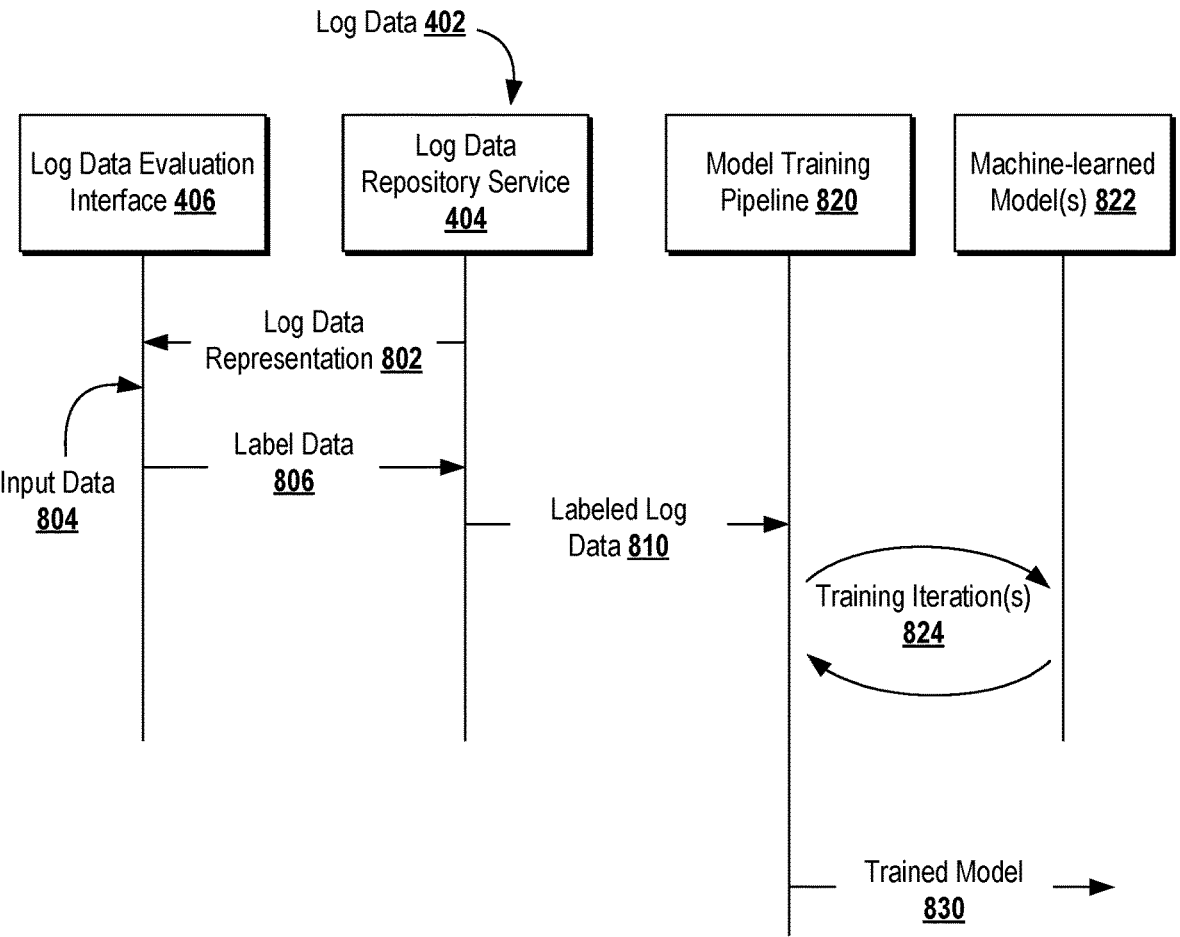
FIG. 8 is an example dataflow diagram for a training pipeline leveraging an example implementation of a lightweight autonomous system evaluation platform, according to some implementations of the present disclosure.

FIG. 8 is an example dataflow diagram for using log data repository service 404 and log data evaluation interface 406 for training one or more machine-learned models. FIG. 8 illustrates an example implementation with various components and events. It is to be understood that the components and events can be rearranged, combined, omitted, etc. within the scope of, and consistent with, the present disclosure.

Log data repository service 404 can output a log data representation 802 to log data evaluation interface 406.

Based on input data 804, log data evaluation interface 406 can output label data 806 to log data repository service 404. Log data repository service 404 can align label data 806 with a corresponding portion of log data (e.g., log data 402 or log data representation 802) to output labeled log data 810. Labeled log data 810 can pass to a model training pipeline 820. Model training pipeline 820 can use labeled log data 810 as a set of training data for training machine-learned model(s) 822 over one or more training iteration(s) 824. Model training pipeline 820 can output trained model 830 that has been trained used labeled log data 810.

Log data representation 802 can be or include a log data sketch 422, detailed log data 426, or any data from any data tier.

Log data evaluation interface 406 can receive input data 804. Input data 804 can indicate a data label or other annotation to be applied to or otherwise stored in association with a portion of the log data associated with log data representation 802. For example, input data 804 can describe a bounding box (e.g., one or more coordinates of vertices of a bounding box) surrounding a portion of log data representation 802 that describes an object. Input data 804 can provide a descriptor of the object that is associated with the bounding box. A bounding box can be two-dimensional (e.g., bird-eye view, range view, etc.). A bounding box can be three-dimensional (e.g., three spatial dimensions, two spatial dimensions and a time dimension). A bounding box can be four-dimensional (e.g., three spatial dimensions and a time dimension).

Label data 806 can be new label data (e.g., no labels existed previously) or edited label data (e.g., prior labels are updated by label data 806). Label data 806 can include confirmation of or edits to automatically generated label data (e.g., generated by a machine-learned label data generation model).

It is to be understood that any type of label data can be generated: classification labels (e.g., indicating a class of a perceived object), trajectory score labels (e.g., indicating a goodness or other metric associated with a trajectory traversed by SUT 400), decision labels (e.g., indicating a decision that SUT 400 did make or should have made in a particular scenario), etc.

Log data evaluation interface 406 can output label data 806 that contains the label obtained from input data 804. Log data evaluation interface 406 can return label data 806 to log data repository service 404 or to another system.

Log data repository service 404 can cause label data 806 to be combined with a portion of log data representation 802. For example, input data 804 can indicate a label for a particular portion of log data representation 802 that is rendered by log data evaluation interface 406. That particular portion of log data representation 802 can be associated with label data 806 to form labeled log data 810.

Log data repository service 404 can cause label data 806 to be combined with a portion of log data 402. Log data repository service 404 can identify a portion of log data 402 associated with input data 804. For example, log data representation 802 can describe log data associated with one or more index values of an indexing parameter. Log data evaluation interface 406 can render portions of log data representation 802 based on a selected value of the indexing parameter. By associating current values for one or more indexing parameters (e.g., a timestamp) with label data 806, log data repository service 404 can use the values to index into log data 402 and retrieve the original, full fidelity log data associated with label data 806. In this manner, for instance, an endpoint device used for labeling log data can execute a lightweight log data evaluation interface for viewing and labeling lightweight representations of log data, but the resulting training data can include the full fidelity of the original log data.

Label data 806 and labeled log data 810 can be stored in an annotation storage layer distinct from storage of log data 402. For instance, log data 402 can be maintained in its original state and any annotations or other added data items can be stored with reference to log data 402.

For a labeling task, an instance of log data evaluation interface 406 can be exposed to an external (e.g., third party) computing system. For instance, a set of credentials can enable access to a customized version of log data evaluation interface 406 that is tailored to a labeling task. This customized version of log data evaluation interface can provide limited functionality for editing or reviewing/confirming label data 806.

Model training pipeline 820 can be or include any type of computing system configured to align model outputs to a desired performance. For instance, model training pipeline 820 can include a system configured to update parameters of machine-learned model(s) 822 based on an evaluation of output(s) from machine-learned model(s) 822.

In an example supervised learning implementation, a training iteration 824 can include inputting a training example (e.g., from labeled log data 810) to machine-learned model(s) 822 to obtain an output from machine-learned model(s) 822. Based on the received output, model training pipeline 820 can update one or more parameters of machine-learned model(s) 822.

Trained model 830 can be output for deployment. For instance, trained model 830 can be output for deployment in a system corresponding to SUT 400 (e.g., one or more systems of an autonomous vehicle computing system).

Figure 9:
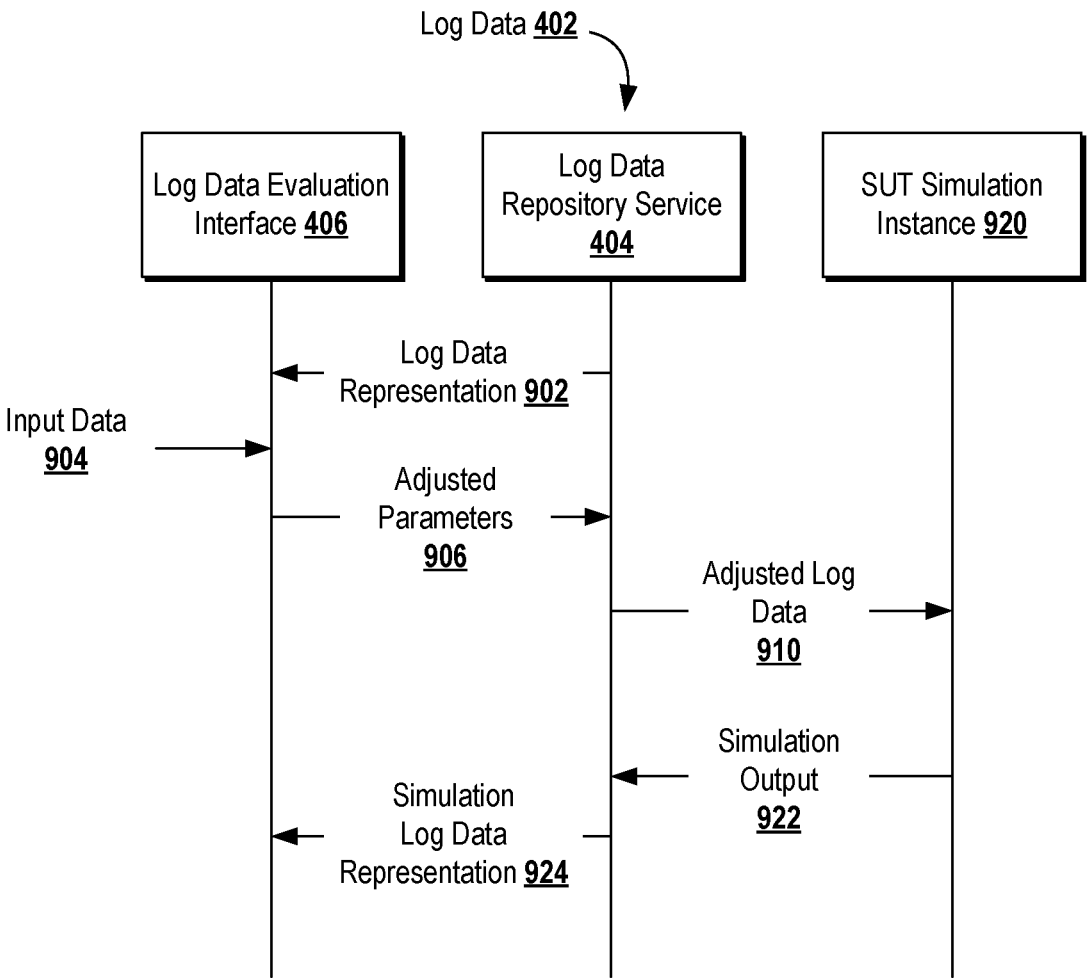
FIG. 9 is an example dataflow diagram for a simulation pipeline leveraging an example implementation of a lightweight autonomous system evaluation platform, according to some implementations of the present disclosure.

FIG. 9 is an example dataflow diagram for using log data repository service 404 and log data evaluation interface 406 for simulating a performance of a system based on adjusted log data. FIG. 9 illustrates an example implementation with various components and events. It is to be understood that the components and events can be rearranged, combined, omitted, etc. within the scope of, and consistent with, the present disclosure.

Log data repository service 404 can ingest log data 402 and output log data representation 902 to log data evaluation interface 406. Log data evaluation interface 406 can receive input data 904 that indicates an adjustment to one or more values of the scene represented by log data representation 902 for simulating how the subject scenario may have differed if the parameters were different. Log data evaluation interface 406 can output adjusted parameters 906 to log data repository service 404, which can bundle adjusted parameters 906 with log data 402 to transmit adjusted log data 910 to a SUT simulation instance 920 for simulating at least a portion of SUT 400 or another SUT based on adjusted log data 910. SUT simulation instance 920 can output a simulation output 922. Simulation output 922 can correspond to simulated log data that can be processed by log data repository service 404 for service to log data evaluation interface 406 as simulation log data representation 924.

Log data representation 902 can be or include a log data sketch 422, detailed log data 426, or any data from any data tier.

Input data 904 can include a request to initiate a simulation. For example, log data representation 902 can represent log data describing a subject scenario. It may be of interest to simulate the subject scenario under different conditions by adjusting a parameter effective to alter the conditions of interest.

Input data 904 can indicate a change in any parameter of log data 402 or log data representation 902. Example changes include a change in a speed of an actor, a distance between actors, a change in a visibility parameter, a software version (e.g., a machine-learned model version), etc.

Log data evaluation interface 406 can output adjust parameters 906 so that log data repository service 404 can facilitate the construction of an appropriate set of input data for SUT simulation instance 920. For example, the full fidelity log data 402 can be accessible to log data repository service 404 and may not be accessible to log data evaluation interface 406 (e.g., due to data constraints, latency constraints, etc.). In this manner, for instance, log data repository service 404 can act as a fully informed intermediary that can merge adjusted parameters 906 with log data 402 to build a complete input structure for SUT simulation instance 920. Conflicts can be resolved in favor of adjusted parameters 906. Data descriptive of conflicts between log data 402 and adjusted parameters 906, or follow-on changes instigated by adjusted parameters 906, can also be rendered via log data evaluation interface 406 to obtain a resolution decision.

Log data repository service 404 can pass adjusted log data 910 to SUT simulation instance 920. Adjusted log data 910 can include a complete input structure configured for processing by SUT simulation instance 920. Adjusted log data 910 can include a complete input structure across values for one or more indexing parameters (e.g., over a time interval).

SUT simulation instance 920 can be implemented on a server, combination of servers, or a distributed set of computing devices which can communicate over a network. For instance, SUT simulation instance 920 can be distributed using one or more physical servers, private servers, or cloud computing instances including one or more cloud-based server systems. SUT simulation instance 920 can communicate with log data repository service 404 to obtain log data 402, adjusted log data 910, or other information for simulating one or more systems. SUT simulation instance 920 can operate locally on a device that is also executing log data evaluation interface 406.

SUT simulation instance 920 can include a computing instance (physical or virtual) executing or simulating one or more components of autonomy system 200. For example, SUT simulation instance 920 can run an instance of localization system 230, perception system 240, planning system 250, control system 260, or any combination thereof. SUT simulation instance 920 can simulate real-world or online operation of a system under test using offline data.

In an example, SUT simulation instance 920 can include a motion planner system (e.g., planning system 250). Adjusted parameters 906 can include modified sensor data which adjusts the position of an actor in a scene to be 10 feet away from an ego vehicle instead of 5 feet away. The simulated planning system can process adjusted log data 910 that describes a scene incorporating the change in the position of the actor and output one or more motion planning outputs (e.g., decisions, trajectories, forecasts, etc.) that correspond to the subject scenario as adjusted according to adjusted parameters 906.

SUT simulation instance 920 can process adjusted log data 910 to generate simulation output 922. Simulation output 922 can correspond to an output similar to one or more components of SUT 400. For instance, simulation output 922 can be similar to log data 402, such as sharing a common structure or format with at least a portion of log data 402. For instance, simulation output 922 can be configured to be simulated log data from a simulated SUT.

Simulation output 922 can be passed directly to log data evaluation interface 406 (e.g., with full fidelity).

Log data repository service 404 can process simulation output 922 in the same manner as log data 402 to serve simulation log data representation 924.

In this manner, for instance, SUT simulation instance 920 can provide rapid iteration and comparison of performance of different versions of a system under test. For instance, a first version of a SUT can generate a first set of outputs reflected in log data 402. A second version of a SUT can include updates to an architecture or codebase. SUT simulation instance 920 can feed inputs from log data 402 to the second version of the SUT to obtain simulation log data that can be evaluated against the original log data 402 to compare a performance of the first version of the SUT and the second version of the SUT.

Figure 10:
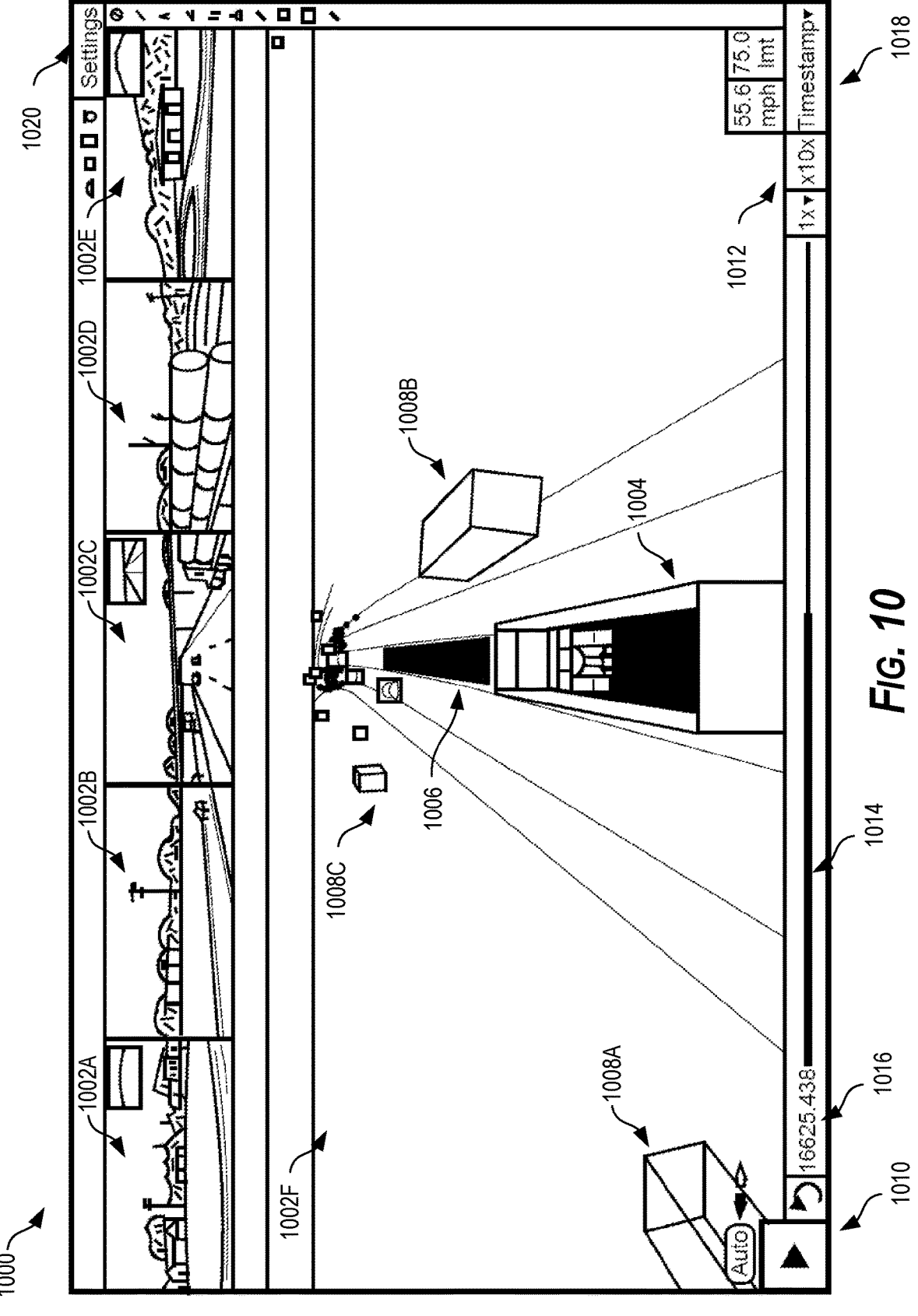
FIG. 10 depicts an example interface of an example implementation of a lightweight autonomous system evaluation platform, according to some implementations of the present disclosure.

FIG. 10 depicts an example user interface of a lightweight autonomous system evaluation platform according to some implementations of the present disclosure. FIG. 10 illustrates an example implementation with various components and events. It is to be understood that the components and events can be rearranged, combined, omitted, etc. within the scope of, and consistent with, the present disclosure.

Example user interface 1000 can include a plurality of log data views 1002A-F that can correspond to different data streams (or combinations of data streams) from a log data representation. For example, views 1002A-E can correspond to image sensor data streams, and view 1002F can correspond to a multi-stream birds-eye view that can include a representation of an ego vehicle (e.g., SUT) 1004 and a trajectory 1006 thereof. View 1002F can also include a representation of actors in the scene, depicted in FIG. 10 in a lightweight manner using bounding boxes for actors 1008A-C. Example user interface 1000 can include playback controls 1010 and rate change controls 1012 to allow a user to navigate the log data representations using control interface 1000.

Log data views 1002A-F can be configured based on log metadata 408. For instance, a number and type of view displayed can be configured in log metadata 408 based on a task associated with example user interface 1000.

Example user interface 1000 can include a timeline slider 1014 displaying a length of a portion of log data and a time indicator 1016 indicating the time position currently in view. Indexing parameters can be switched or otherwise controlled using interface feature 1018.

Various elements of example user interface 100 can include interactive user interface elements. For instance, respective elements can each be selectable, adjustable, or interactive. Example types of interactive elements may include soft buttons, menus, checkboxes, sliders, etc.

Example user interface 1000 can display an example log data sketch 422. For instance, log data views 1002A-F can provide a preview of log data 402. The preview can include lightweight representations of various portions of log data 402 that correspond to different data streams (e.g., data from different sensors).

For example, the data streams can include data streams associated with respective sensors of a plurality of sensors. Respective sensors can capture different data describing a surrounding environment of ego vehicle 1004. For instance, log data views 1002A-B can display sensor data captured by sensors positioned to observe a left portion of the environment of from the perspective of ego vehicle 1004. Log data views 1002C-D can display sensor data captured by forward-looking sensors from the perspective of ego vehicle 1004. Log data view 1002E can display sensor data captured by sensors positioned to observe a right portion of the environment from the perspective of ego vehicle 1004. As such log data views 1002A-E can display a plurality of views of log data 402 of the same subject scenario.

Example user interface 1000 can include log data view 1002F. Log data view 1002F can include multiple different data types. For instance, log data view 1002F can display planning data (e.g., planned trajectory 1006 of ego vehicle 1004), perception data (e.g., detected actors 1008A-C, etc.), map data (e.g., lanes of a roadway), etc.

The various data streams displayed in example user interface 1000 can be synchronized based on a shared value of an indexing parameter. For data streams that operate at different precision with respect to the indexing parameter (e.g., different framerates, sample rates, etc.), data frames can be interpolated to synchronize the data streams.

As an initial preview, the data streams presented in example user interface 1000 can be loaded from a rapid response data tier for low-latency visualization of log data 402. However, as a user interacts with example interface 1000, the user can provide inputs indicating inspection of the presented data. For instance, a user can pause a playback of log data by interacting with a playback control 1010. The user can provide an inspection indicator by interacting with one or more setting input interfaces 1020. The setting input interfaces can include interactive (e.g., clickable, selectable, etc.) user interface elements that facilitate indicating closer inspection of log data.

The inputs can trigger loading of more detailed representations of log data 402 according to example aspects of the present disclosure.

Figure 11:
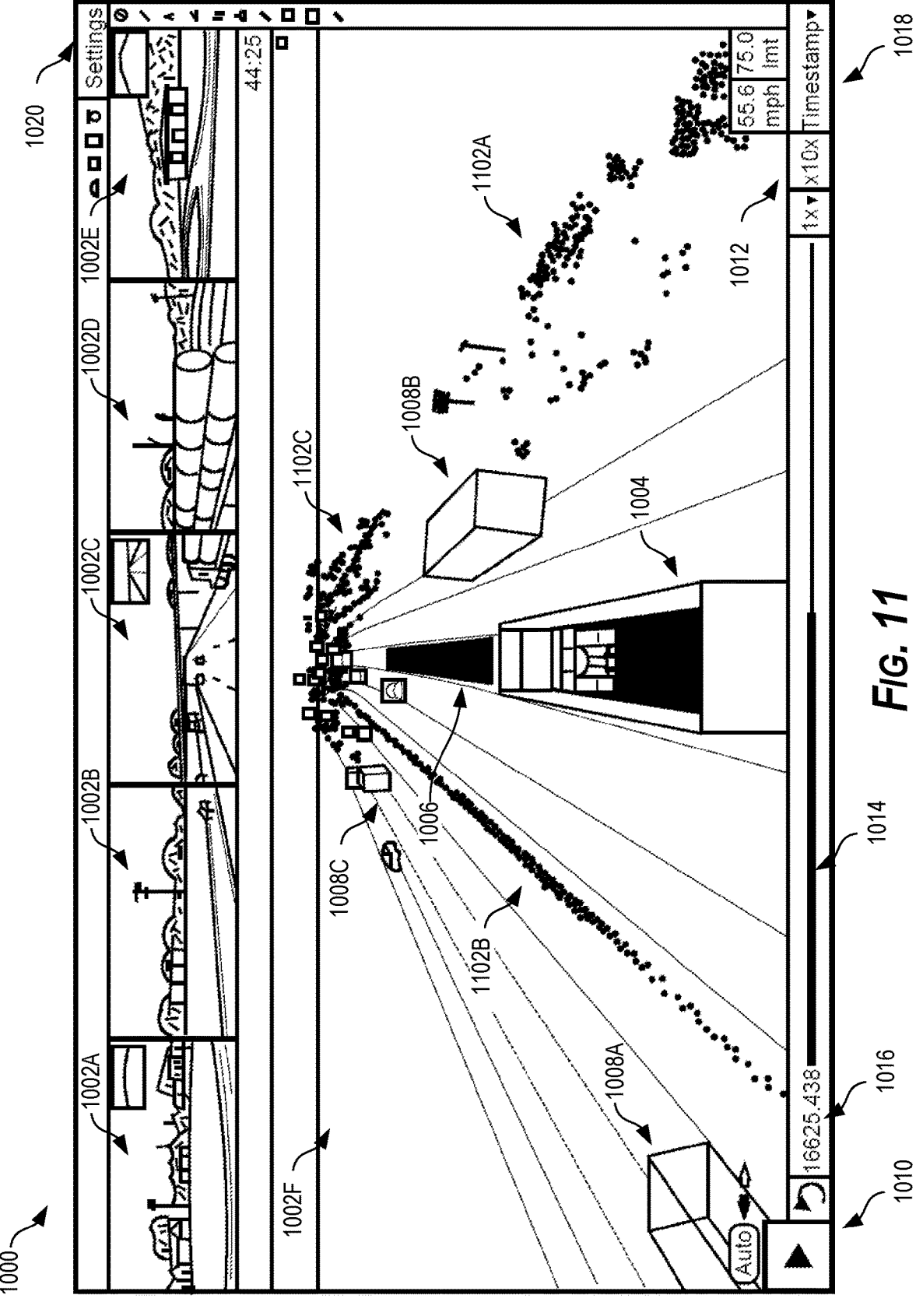
FIG. 11 depicts an example user interface of a lightweight autonomous system evaluation platform, according to some implementations of the present disclosure.

FIG. 11 is an example user interface of an example implementation of a lightweight autonomous system evaluation platform according to some implementations of the present disclosure that displays more detailed representation(s) as compared to the example shown in FIG. 10. FIG. 11 illustrates an example implementation with various components and events. It is to be understood that the components and events can be rearranged, combined, omitted, etc. within the scope of, and consistent with, the present disclosure.

As shown in FIG. 11, example user interface 1000 can display additional detail as responsive to processing of an inspection indicator. For instance, additional detail can include LIDAR data 1102A-C. The additional detail can be loaded from a detailed data tier after an initial loading period because dense point clouds can use a larger data budget or latency budget.

Figure 12:
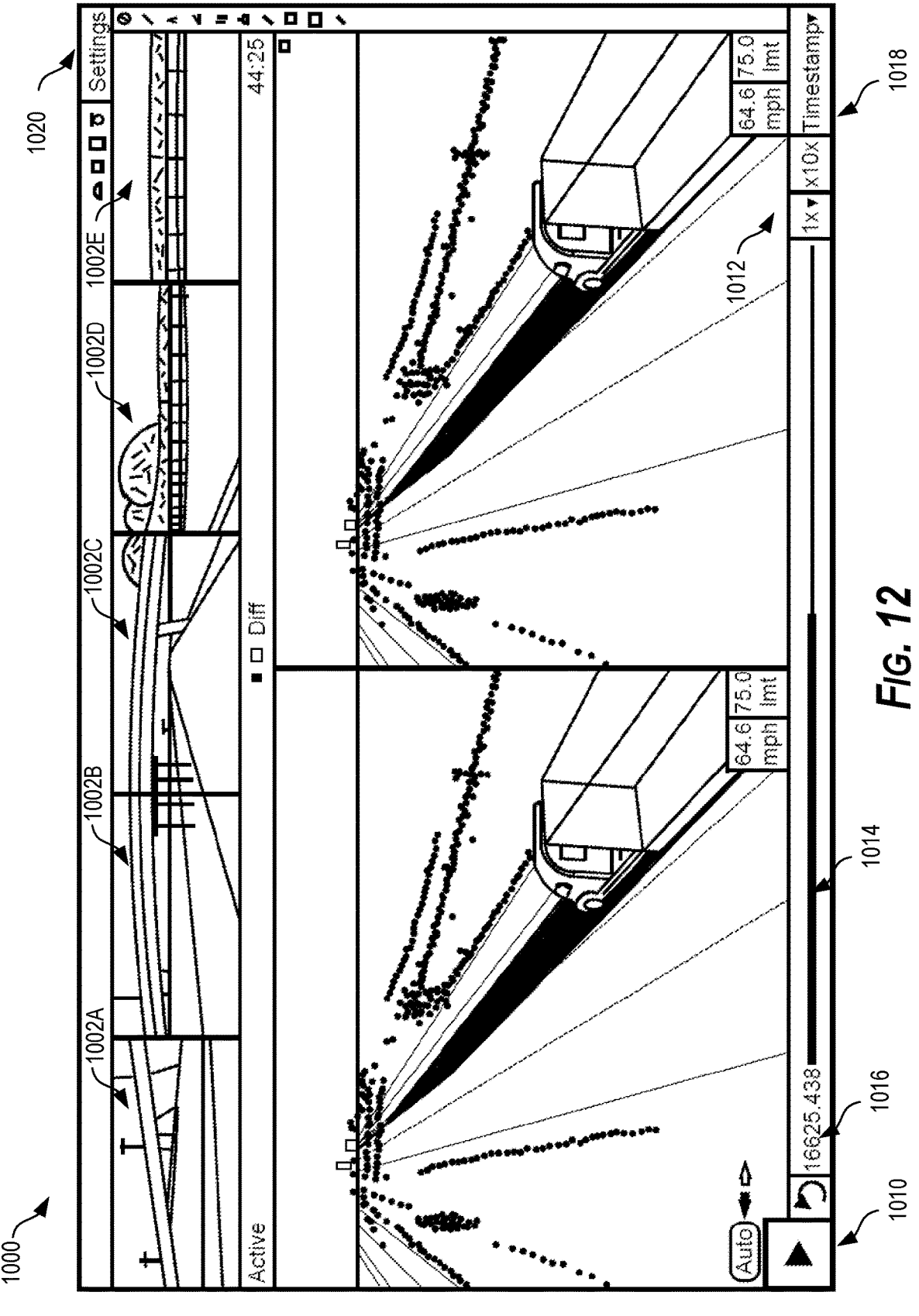
FIG. 12 depicts an example user interface of a lightweight autonomous system evaluation platform, according to some implementations of the present disclosure.

FIG. 12 is an example interface of a lightweight autonomous system evaluation platform implementing a split screen display according to some implementations of the present disclosure. FIG. 12 illustrates an example implementation with various components and events. It is to be understood that the components and events can be rearranged, combined, omitted, etc. within the scope of, and consistent with, the present disclosure.

As shown in FIG. 12, example user interface 1000 can include a split screen view to display different log data concurrently. The split screen view can synchronize different log data based on an indexing parameter (e.g., a time parameter, a location parameter) to facilitate comparison. For example, an "active" pane can represent log data generated during one logging period. A "diff" pane can represent log data generated during another logging period, such as log data generated by a different system under test.

For example, different versions of SUT 400 can generate log data based on the same input scenario. For instance, the active pane can be configured to display log data from an active version of a system (e.g., a version of a system running on SUT 400, etc.) and a different version (e.g., a test version, etc.). Log data from a version can be obtained as described with respect to FIG. 9. Example user interface 1000 can include more than two views across more than two versions.

Figure 13:
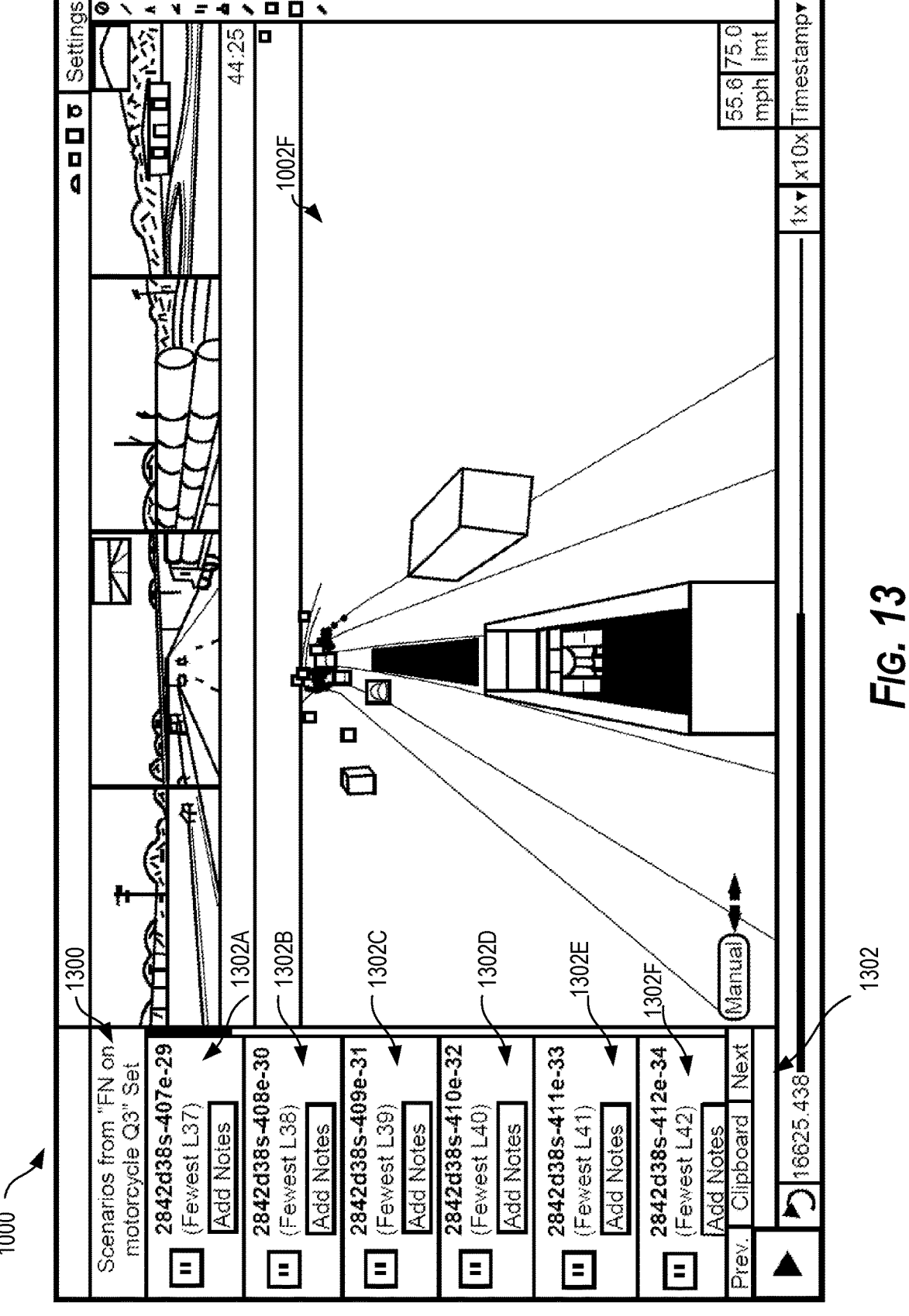

FIG. 13 is an example interface of a lightweight autonomous system evaluation platform implementing a playlist according to some implementations of the present disclosure. FIG. 13 illustrates an example implementation with various components and events. It is to be understood that the components and events can be rearranged, combined, omitted, etc. within the scope of, and consistent with, the present disclosure.

Example user interface 1000 can depict a playlist view 1300 of log data representations. Playlist view 1300 can include a list of a plurality of log data representations of subject scenarios (e.g., short clips) for viewing. For instance, playlist view 1300 can include a plurality of log data representations corresponding to different subject scenarios 1302A-F.

The plurality of subject scenarios 1302A-F can correspond to respective log data sketches. A user can add specific log data to a list or generate a list from a report for viewing in the playlist. For instance, a user can provide user input indicating a list of simulations that failed within a specified time. The list of simulations that failed within a specified time can be used to generate playlist view 1300. In response to user input, log data evaluation interface 406 can generate and output log data requests to obtain data representations for displaying the log data referenced in the playlist.

Log data evaluation interface 406 can buffer or preload resources associated with the playlist items. This preloading or buffering can occur as one playlist item is ending and as the next is about to begin. This can facilitate seamless rendering of different representations in the list.

Figure 14:
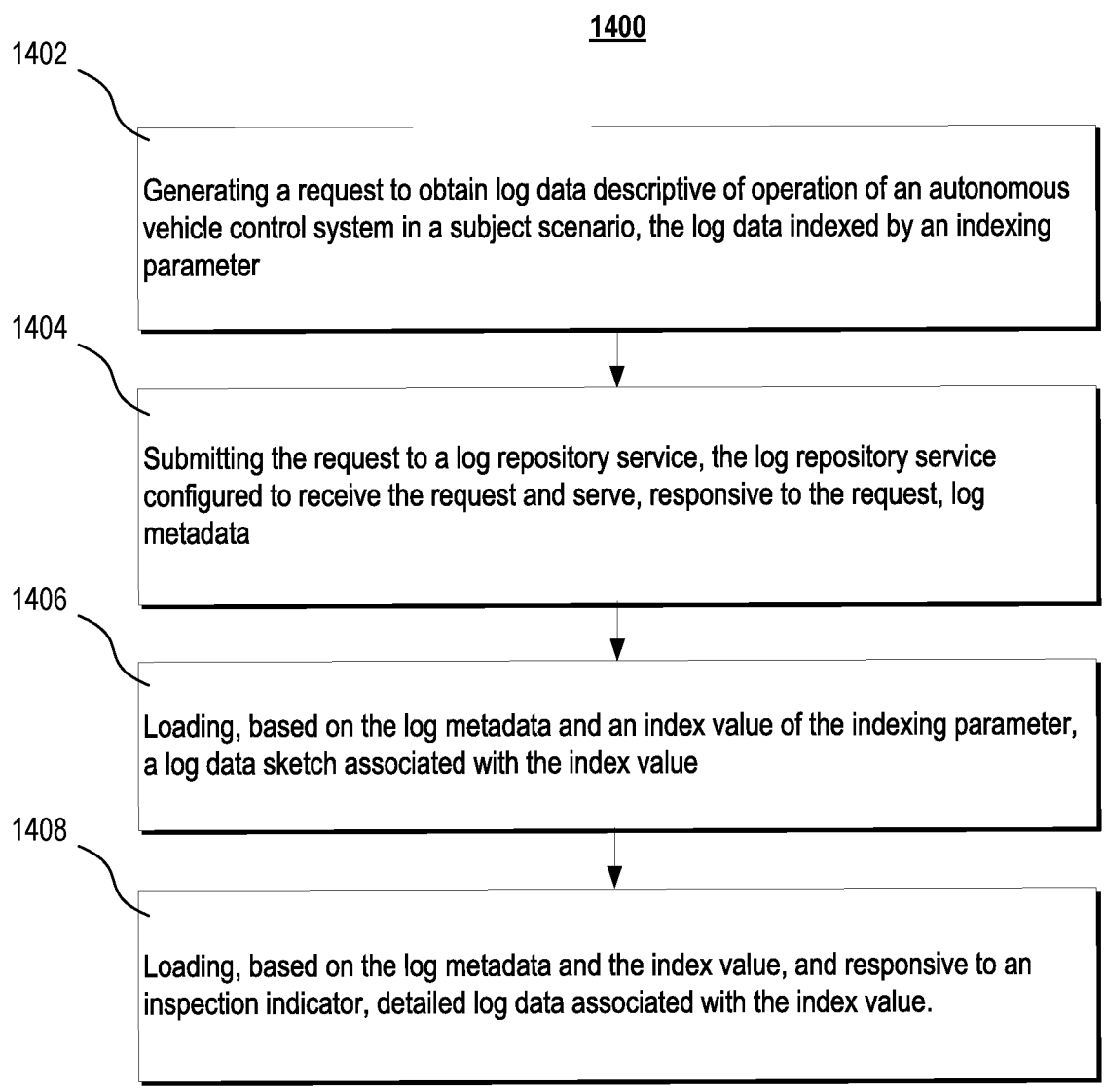
FIG. 14 depicts an example user interface of a lightweight autonomous system evaluation platform, according to some implementations of the present disclosure.

FIG. 14 is an example flowchart of an example method 1400 for autonomous vehicle control system evaluation according to some implementations of the present disclosure. One or more portion(s) of the method 1400 can be implemented by a computing system that includes one or more computing devices such as, for example, the computing systems described with reference to the other figures (e.g., autonomous platform 110, vehicle computing system 180, remote system(s) 160, a system of FIGS. 1-17, etc.). Each respective portion of the method 1400 can be performed by any (or any combination) of one or more computing devices. Moreover, one or more portion(s) of the method 1400 can be implemented on the hardware components of the device(s) described herein (e.g., as in FIGS. 1-17, etc.), for example, to evaluate an autonomy system for an autonomous vehicle.

FIG. 14 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 14 is described with reference to elements/terms described with respect to other systems and figures for exemplary illustrated purposes and is not meant to be limiting. One or more portions of method 1400 can be performed additionally, or alternatively, by other systems.

At 1402, example method 1400 can include generating a request to obtain log data descriptive of operation of an autonomous vehicle control system in a subject scenario. The log data can be indexed by an indexing parameter. For instance, log data evaluation interface 406 can generate log data request 420. Log data request 420 can indicate log data 402 associated with an operation of SUT 400 (which can be or include autonomy system 200) in a subject scenario (e.g., in a real or simulated driving scenario). Log data 402 generated by autonomy system 200 can be indexed and stored in a storage system associated with log data repository service 404. Log data 402 can be indexed based on a timestamp (e.g., a time when a portion of log data 402 was generated). Log data 402 can be indexed based on any data features such as location, modality, events, etc.

In some implementations of example method 1400, the log data can include trace log descriptive of one or more intermediate values (or traces) generated by the autonomous vehicle control system. For instance, log data 402 can include one or more intermediate values or internal states of autonomy system 200.

In some implementations of example method 1400, the log data comprises a plurality of data modalities. For instance, the log data can include data from multiple different data sources within SUT 400 or external to SUT 400. In some implementations of example method 1400, the plurality of data modalities include perception data and planning data. In some implementations of example method 1400, the log data includes at least one of localization data, map data, perception data, planning data, control data, communications data, or other data.

At 1404, example method 1400 can include submitting the request to a log repository service. The log repository service can be configured to receive the request and serve, responsive to the request, log metadata. For example, log data evaluation interface 406 can transmit log data request 420 to log data repository service 404. Log data repository service can serve log metadata 408 in return. Log data evaluation interface 406 can obtain and display log data representations based on log metadata 408.

In some implementations of example method 1400, the evaluation interface runs in a browser. In some implementations of example method 1400, log metadata is retrieved upon loading of an initial set of markup instructions for the evaluation interface. For example, log metadata 408 can be fetched and loaded quickly upon parsing the html received for display in a browser for executing log data evaluation interface 406.

At 1406, example method 1400 can include loading, based on the log metadata and an index value of the indexing parameter, a log data sketch associated with the index value. For example, log data evaluation interface 406 can fetch a log data sketch 422 that contains log data representation(s) corresponding to the index value. For instance, an index value can be a time value, and log data evaluation interface 406 can fetch a log data sketch 422 that contains log data representation(s) corresponding to the time value.

In some implementations of example method 1400, the log data sketch includes log data reduced according to an identifier of an object of interest. For example, the request to log repository service 404 can include a query for log data related to motorcycles perceived by an autonomous system. Based on the query, the returned log data sketch(es) can include data having an identifier that is associated with a motorcycle. Other data can be deprioritized.

In some implementations of example method 1400, the log data sketch includes a downsampled representation of the log data. In some implementations of example method 1400, the log data sketch includes a reduced range of log data values from the log data. For instance, log data can be clipped, binned, resized, cropped, compressed with lossy compression, etc.

At 1408, example method 1400 can include loading, based on the log metadata and the index value, and responsive to an inspection indicator, detailed log data associated with the index value. For example, log data evaluation interface 406 can transmit a detailed log data request 424 to retrieve a log data representation containing more detail in a particular area based on viewing or navigating within log data sketch 422.

In some implementations of example method 1400, the log data sketch includes data at a first fidelity with respect to the log data. For instance, log data sketch 422 can include lightweight primitive representations of the original log data, such as vector-based graphical features that represent dense point cloud or raster data. In some implementations of example method 1400, the detailed log data includes data at a second fidelity higher than the first fidelity. For instance, detailed log data 426 can include the original point cloud or raster data or a subsampled representation thereof that adds detail in comparison to the generated primitives. Detailed log data 426 can include generated primitives that are configured to represent greater detail. For instance, a first generated primitive for log data sketch 422 can be generated with a first polygon count or surface count, and a second generated primitive for detailed log data 426 can be generated with a second polygon count or surface count higher than the first. Log data sketch 422 can include data associated with a rapid response data tier. Detailed log data 426 can include data associated with a more detailed data tier, such as an intermediate data tier or a detailed data tier.

In some implementations of example method 1400, the log data sketch includes data at a first resolution. In some implementations of example method 1400, the detailed log data includes data at a second resolution higher than the first resolution. For instance, log data sketch 422 can be characterized by a first precision or resolution and detailed log data 426 can be characterized by a second precision or resolution higher than the first. Log data sketch 422 can contain data obtained by subsampling or otherwise reducing a dimensionality of the original log data. Detailed log data 426 can contain data obtained directly from the original log data or by subsampling with a higher frequency or otherwise reducing, to a lesser extent, a dimensionality of the original log data.

In some implementations of example method 1400, the inspection indicator corresponds to a user input. An inspection indicator can include, for example, pausing a playback of data from the log data sketch 422, clicking on one or more objects displayed, scrubbing a timeline, etc. In some implementations of example method 1400, a user input sequence corresponds to a plurality of index values of the indexing parameter (e.g., a time period, a spatial area, etc.). In some implementations of example method 1400, the inspection indicator corresponds to a selection of a particular index value or subset of index values of the plurality of index values (e.g., a particular time, a particular area, a "zoom" or magnification operation, etc.).

In some implementations of example method 1400, the user input sequence corresponds to a scrubbing input. In some implementations of example method 1400, the selection of the particular index value corresponds to a rate change in the scrubbing input associated with the particular index value.

In some implementations of example method 1400, the detailed log data is not buffered. In some implementations of example method 1400, the detailed log data is dynamically loaded or output on-demand. For example, detailed log data 426 can be retrieved on-demand as a user inspects a portion of log data sketch 422 more closely.

FIG. 15 is an example flowchart of an example method 1500 for autonomous vehicle control system evaluation according to some implementations of the present disclosure. One or more portion(s) of the method 1500 can be implemented by a computing system that includes one or more computing devices such as, for example, the computing systems described with reference to the other figures (e.g., autonomous platform 110, vehicle computing system 180, remote system(s) 160, a system of FIGS. 1-17, etc.). Each respective portion of the method 1500 can be performed by any (or any combination) of one or more computing devices. Moreover, one or more portion(s) of the method 1500 can be implemented on the hardware components of the device(s) described herein (e.g., as in FIGS. 1-17, etc.), for example, to evaluate an autonomy system for an autonomous vehicle.

FIG. 15 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 15 is described with reference to elements/terms described with respect to other systems and figures for exemplary illustrated purposes and is not meant to be limiting. One or more portions of method 1500 can be performed additionally, or alternatively, by other systems.

At 1502, example method 1500 can include receiving, from an evaluation interface, a request to obtain log data descriptive of operation of an autonomous vehicle control system in a subject scenario. The log data can be indexed by an indexing parameter. For instance, log data evaluation interface 406 can generate log data request 420. Log data repository service 404 can receive log data request 420. Log data request 420 can indicate log data 402 associated with an operation of SUT 400 (which can be or include autonomy system 200) in a subject scenario (e.g., in a real or simulated driving scenario). Log data 402 generated by autonomy system 200 can be indexed and stored in a storage system associated with log data repository service 404. Log data 402 can be indexed based on a timestamp (e.g., a time when a portion of log data 402 was generated). Log data 402 can be indexed based on any data features such as location, modality, events, etc.

In some implementations of example method 1500, the log data can include trace log descriptive of one or more intermediate values (or traces) generated by the autonomous vehicle control system. For instance, log data 402 can include one or more intermediate values or internal states of autonomy system 200.

In some implementations of example method 1500, the log data comprises a plurality of data modalities. For instance, the log data can include data from multiple different data sources within SUT 400 or external to SUT 400. In some implementations of example method 1500, the plurality of data modalities include perception data and planning data. In some implementations of example method 1500, the log data includes at least one of localization data, map data, perception data, planning data, control data, communications data, or other data.

At 1504, example method 1500 can include serving, to the evaluation interface and responsive to the request, log metadata. The log repository service can be configured to receive the request and serve, responsive to the request, log metadata. For example, log data evaluation interface 406 can transmit log data request 420 to log data repository service 404. Log data repository service 404 can serve log metadata 408 in return. Log data repository service 404 can access a storage system that stores log data (e.g., log data 402) and generate or obtain log metadata 408 that provides a manifest of resources associated with log data 402. Log metadata 408 can indicate resources of varying levels of detail.

In some implementations of example method 1400, the evaluation interface runs in a browser. In some implementations of example method 1400, log metadata is retrieved upon loading of an initial set of markup instructions for the evaluation interface. For example, log metadata 408 can be fetched and loaded quickly upon parsing the html received for display in a browser for executing log data evaluation interface 406.

At 1506, example method 1500 can include outputting, based on the log metadata and an index value of the indexing parameter, a log data sketch associated with the index value. For example, log data repository service 404 can send to log data evaluation interface 406 a log data sketch 422 that contains log data representation(s) corresponding to the index value. For instance, an index value can be a time value, and log data evaluation interface 406 can obtain a log data sketch 422 that contains log data representation(s) corresponding to the time value.

In some implementations of example method 1500, the log data sketch includes log data reduced according to an identifier of an object of interest. For example, the request to log repository service 404 can include a query for log data related to motorcycles perceived by an autonomous system. Based on the query, the returned log data sketch(es) can include data having an identifier that is associated with a motorcycle. Other data can be deprioritized.

In some implementations of example method 1500, the log data sketch includes a downsampled representation of the log data. In some implementations of example method 1500, the log data sketch includes a reduced range of log data values from the log data. For instance, log data can be clipped, binned, resized, cropped, compressed with lossy compression, etc.

At 1508, example method 1500 can include outputting, based on the log metadata and the index value, and responsive to an inspection indicator, detailed log data associated with the index value. For example, log data evaluation interface 406 can transmit a detailed log data request 424 to retrieve a log data representation containing more detail in a particular area based on viewing or navigating within log data sketch 422. Detailed log data request 424 can be based on the detection of an inspection indicator. Log data repository service can respond to detailed log data request 424 by serving a more detailed log data representation that provides additional log data detail at an index value of interest.

In some implementations of example method 1500, the log data sketch includes data at a first fidelity with respect to the log data. For instance, log data sketch 422 can include lightweight primitive representations of the original log data, such as vector-based graphical features that represent dense point cloud or raster data. In some implementations of example method 1500, the detailed log data includes data at a second fidelity higher than the first fidelity. For instance, detailed log data 426 can include the original point cloud or raster data or a subsampled representation thereof that adds detail in comparison to the generated primitives. Detailed log data 426 can include generated primitives that are configured to represent greater detail. For instance, a first generated primitive for log data sketch 422 can be generated with a first polygon count or surface count, and a second generated primitive for detailed log data 426 can be generated with a second polygon count or surface count higher than the first. Log data sketch 422 can include data associated with a rapid response data tier. Detailed log data 426 can include data associated with a more detailed data tier, such as an intermediate data tier or a detailed data tier.

In some implementations of example method 1500, the log data sketch includes data at a first resolution. In some implementations of example method 1500, the detailed log data includes data at a second resolution higher than the first resolution. For instance, log data sketch 422 can be characterized by a first precision or resolution and detailed log data 426 can be characterized by a second precision or resolution higher than the first. Log data sketch 422 can contain data obtained by subsampling or otherwise reducing a dimensionality of the original log data. Detailed log data 426 can contain data obtained directly from the original log data or by subsampling with a higher frequency or otherwise reducing, to a lesser extent, a dimensionality of the original log data.

In some implementations of example method 1500, the inspection indicator corresponds to a user input. An inspection indicator can include, for example, pausing a playback of data from the log data sketch 422, clicking on one or more objects displayed, scrubbing a timeline, etc. In some implementations of example method 1500, a user input sequence corresponds to a plurality of index values of the indexing parameter (e.g., a time period, a spatial area, etc.). In some implementations of example method 1500, the inspection indicator corresponds to a selection of a particular index value or subset of index values of the plurality of index values (e.g., a particular time, a particular area, a "zoom" or magnification operation, etc.).

In some implementations of example method 1500, the user input sequence corresponds to a scrubbing input. In some implementations of example method 1500, the selection of the particular index value corresponds to a rate change in the scrubbing input associated with the particular index value.

In some implementations of example method 1500, the detailed log data is not buffered. In some implementations of example method 1500, the detailed log data is dynamically loaded or output on-demand. For example, detailed log data 426 can be retrieved on-demand as a user inspects a portion of log data sketch 422 more closely.

FIG. 16 depicts a flowchart of example method 1600 for training one or more machine-learned operational models according to aspects of the present disclosure. For instance, an operational system (e.g., a SUT 400) can include a machine-learned operational model. One or more portion(s) of the method 1600 can be implemented by a computing system that includes one or more computing devices such as, for example, the computing systems described with reference to the other figures (e.g., autonomous platform 110, vehicle computing system 180, remote system(s) 160, a system of FIG. 12, etc.). Each respective portion of the method 1600 can be performed by any (or any combination) of one or more computing devices. Moreover, one or more portion(s) of method 1600 can be implemented on the hardware components of the device(s) described herein (e.g., as in FIGS. 1, 2, 12, etc.), for example, to validate one or more systems or models.

FIG. 16 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 16 is described with reference to elements/terms described with respect to other systems and figures for exemplary illustrated purposes and is not meant to be limiting. One or more portions of method 1600 can be performed additionally, or alternatively, by other systems.

At 1602, example method 1600 can include obtaining training data for training a machine-learned operational model. The training data can include a plurality of training instances (e.g., reference planning data, such as labeled trajectories or strategies based on expert demonstrations).

The training data can include data collected using one or more autonomous platforms (e.g., autonomous platform 110) or the sensors thereof as the autonomous platform is within its environment. By way of example, the training data can be collected using one or more autonomous vehicle(s) (e.g., autonomous platform 110, autonomous vehicle 310, autonomous vehicle 350, etc.) or sensors thereof as the vehicle(s) operates along one or more travel ways. In some examples, the training data can be collected using other sensors, such as mobile-device-based sensors, ground-based sensors, aerial-based sensors, satellite-based sensors, or substantially any sensor interface configured for obtaining and/or recording measured data.

The training data can include data labeled according to the present disclosure (e.g., as described with respect to FIG. 8).

The training data can include a plurality of training sequences divided between multiple datasets (e.g., a training dataset, a validation dataset, or testing dataset). Each training sequence can include a plurality of pre-recorded perception datapoints, point clouds, images, etc. In some implementations, each sequence can include LIDAR point clouds (e.g., collected using LIDAR sensors of an autonomous platform), images (e.g., collected using mono or stereo imaging sensors, etc.), and the like. For instance, in some implementations, a plurality of images can be scaled for training and evaluation.

At 1604, example method 1600 can include selecting a training instance based at least in part on the training data.

At 1606, example method 1600 can include inputting the training instance into the machine-learned operational model.

At 1608, example method 1600 can include generating one or more loss metric(s) and/or one or more objective(s) for the machine-learned operational model based on output(s) of at least a portion of the machine-learned operational model and label(s) associated with the training instances.

At 1610, example method 1600 can include modifying at least one parameter of at least a portion of the machine-learned operational model based at least in part on at least one of the loss metric(s) and/or at least one of the objective(s). For example, a computing system can modify at least a portion of the machine-learned operational model based at least in part on at least one of the loss metric(s) and/or at least one of the objective(s).

In some implementations, the machine-learned operational model can be trained in an end-to-end manner. For example, in some implementations, the machine-learned operational model can be fully differentiable.

After being updated, the operational model or the operational system including the operational model can be provided for validation. In some implementations, a validation system can evaluate or validate the operational system. The validation system can trigger retraining, decommissioning, etc. of the operational system based on, for example, failure to satisfy a validation threshold in one or more areas.

Figure 17:
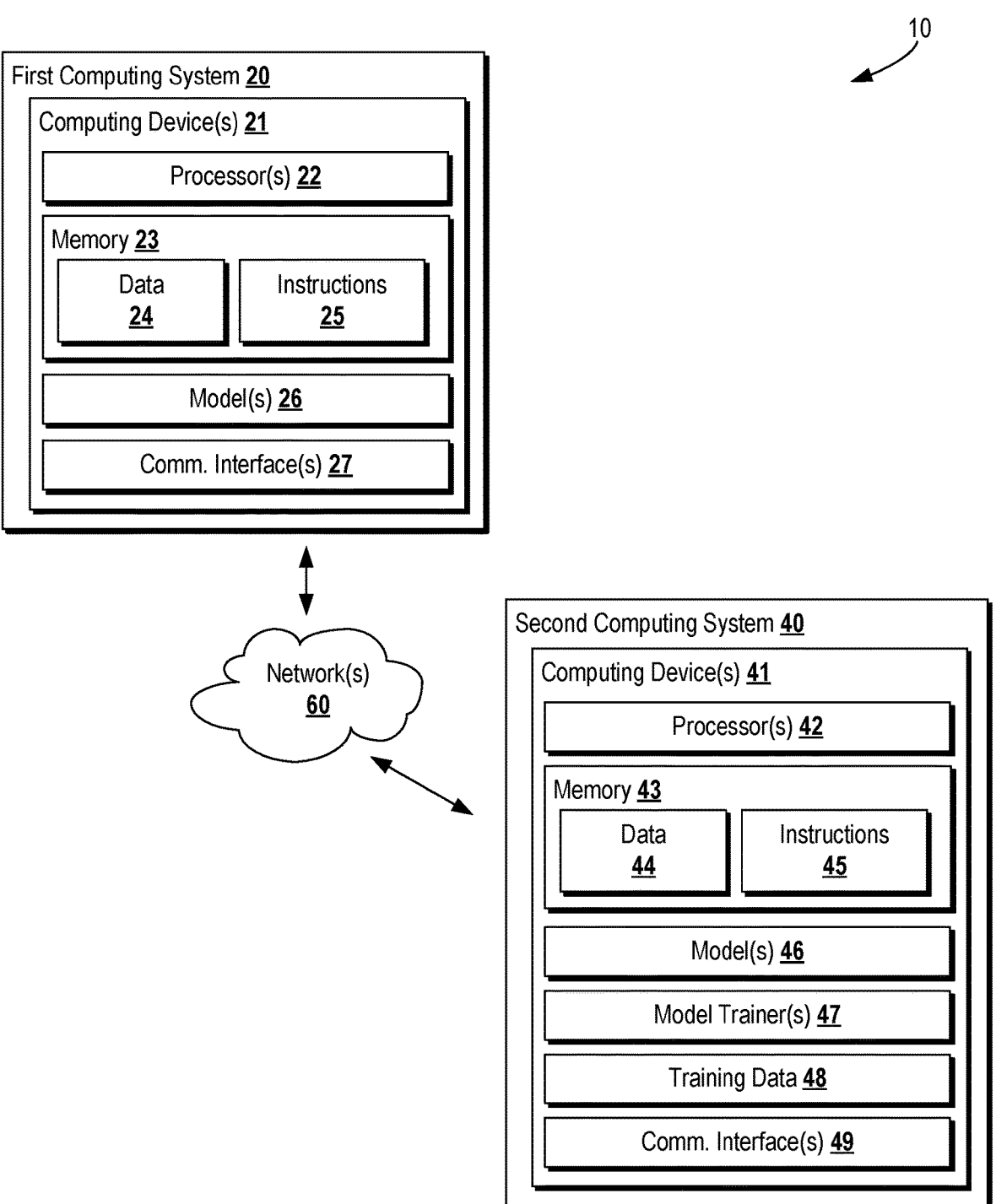
FIG. 17 is a block diagram of an example computing system, according to some implementations of the present disclosure.

FIG. 17 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for validating one or more systems or operational systems (e.g., the remote system(s) 160, the onboard computing system(s) 180, the autonomy system(s) 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. Memory 23 can include one or more non-transitory computer-readable storage media, such as RAM, ROM, EEPROM, EPROM, one or more memory devices, flash memory devices, etc., and combinations thereof.

Memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

Memory 23 can store computer-readable instructions 25 that can be executed by the one or more processors 22. Instructions 25 can be software written in any suitable programming language or can be implemented in hardware. Additionally, or alternatively, instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

Memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

Memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. As examples, the model(s) 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. For example, in some implementations, the first computing system 20 can include a computing system onboard or otherwise associated with a real or simulated autonomous vehicle. In some implementations, model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 17 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A computer-implemented method for autonomous vehicle control system evaluation, comprising:
   (a) generating a request to obtain log data descriptive of operation of an autonomous vehicle control system in a subject scenario, the log data indexed by an indexing parameter;
   (b) submitting the request to a log repository service, the log repository service configured to receive the request and serve, responsive to the request, log metadata;
   (c) loading, based on the log metadata and an index value of the indexing parameter, a log data sketch associated with the index value;
   (d) generating, using a machine-learned model, a data tier corresponding to the log data based on the log data sketch, wherein:
       the data tier is associated with a priority of the log data based on a predicted indication for further evaluation, and the data tier corresponds to at least a first latency budget and a second latency budget wherein the first latency budget and the second latency budget are associated with loading the log data at different speeds according to the priority; and
   (e) loading, based on the data tier, the log metadata, and the index value, and responsive to an inspection indicator, detailed log data associated with the index value.

2. The computer-implemented method of claim 1, wherein:
   the log data sketch comprises data at a first fidelity with respect to the log data; and
   the detailed log data comprises data at a second fidelity higher than the first fidelity.

3. The computer-implemented method of claim 1, wherein loading the log data sketch comprises rendering the log data sketch on a display interface.

4. The computer-implemented method of claim 1, wherein a user input sequence comprises a plurality of index values of the indexing parameter, and wherein the inspection indicator corresponds to a selection of a particular index value of the plurality of index values.

5. The computer-implemented method of claim 1, wherein a sketch compression value associated with the log data sketch is adjusted based on a communication speed between a log data repository and an evaluation interface.

6. The computer-implemented method of claim 1 comprising:
   (f) modifying, from a default value, one or more parameters of the log metadata to customize contents of the log data sketch.

7. The computer-implemented method of claim 1, wherein the detailed log data is dynamically loaded or output on-demand.

8. The computer-implemented method of claim 1, wherein the inspection indicator corresponds to a user input.

9. The computer-implemented method of claim 8, wherein a user input sequence corresponds to a scrubbing input, and wherein a selection of a particular index value corresponds to a rate change in the scrubbing input associated with the particular index value.

10. The computer-implemented method of claim 1, wherein the indexing parameter is time.

11. The computer-implemented method of claim 1, wherein:
   the log data sketch comprises data at a first resolution; and
   the detailed log data comprises data at a second resolution higher than the first resolution.

12. The computer-implemented method of claim 1, wherein the log data sketch comprises a downsampled representation of the log data.

13. The computer-implemented method of claim 1, wherein the log data sketch comprises a reduced range of log data values from the log data.

14. The computer-implemented method of claim 1, wherein the log data sketch is loaded by an evaluation interface that runs in a browser, and wherein the log metadata is retrieved upon loading of an initial set of markup instructions for the evaluation interface.

15. A computing system comprising:
   one or more processors; and
   one or more non-transitory computer-readable media storing instructions executable by the one or more processors to cause the computing system to perform operations, the operations comprising:

(a) generating a request to obtain log data descriptive of operation of an autonomous vehicle control system in a subject scenario, the log data indexed by an indexing parameter;

(b) submitting the request to a log repository service, the log repository service configured to receive the request and serve, responsive to the request, log metadata;

(c) loading, based on the log metadata and an index value of the indexing parameter, a log data sketch associated with the index value;

(d) generating, using a machine-learned model, a data tier corresponding to the log data based on the log data sketch, wherein:

the data tier is associated with a priority of the log data based on a predicted indication for further evaluation, and the data tier corresponds to at least a first latency budget and a second latency budget wherein the first latency budget and the second latency budget are associated with loading the log data at different speeds according to the priority; and (e) loading, based on the data tier, the log metadata, and the index value, and responsive to an inspection indicator, detailed log data associated with the index value.

16. The computing system of claim 15, wherein:

the log data sketch comprises data at a first fidelity with respect to the log data; and the detailed log data comprises data at a second fidelity higher than the first fidelity.

17. The computing system of claim 15, wherein loading the log data sketch comprises rendering the log data sketch on a display interface.

18. The computing system of claim 15, wherein a user input sequence comprises a plurality of index values of the indexing parameter, and wherein the inspection indicator corresponds to a selection of a particular index value of the plurality of index values.

19. The computing system of claim 15, the operations comprising:

(D) modifying, from a default value, one or more parameters of the log metadata to customize contents of the log data sketch.

20. One or more non-transitory computer-readable media storing instructions executable by one or more processors to cause a computing system to perform operations, the operations comprising:

(a) generating a request to obtain log data descriptive of operation of an autonomous vehicle control system in a subject scenario, the log data indexed by an indexing parameter;

(b) submitting the request to a log repository service, the log repository service configured to receive the request and serve, responsive to the request, log metadata;

(c) loading, based on the log metadata and an index value of the indexing parameter, a log data sketch associated with the index value;

(d) generating, using a machine-learned model, a data tier corresponding to the log data based on the log data sketch, wherein:

the data tier associated with a priority of the log data based on a predicted indication for further evaluation, and the data tier corresponds to at least a first latency budget and a second latency budget wherein the first latency budget and the second latency budget are associated with loading the log data at different speeds according to the priority; and (e) loading, based on the data tier, the log metadata, and the index value, and responsive to an inspection indicator, detailed log data associated with the index value.

* * * * *